US008773594B2

(12) United States Patent
Gohshi

(10) Patent No.: US 8,773,594 B2
(45) Date of Patent: Jul. 8, 2014

(54) SIGNAL PROCESSING DEVICE, AND INTEGRATED CIRCUIT INCLUDING OBLIQUE LOWPASS FILTERING AND MULTIPLE SHARPENING COMPONENTS

(75) Inventor: Seiichi Gohshi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/823,299

(22) PCT Filed: Sep. 22, 2011

(86) PCT No.: PCT/JP2011/071706
§ 371 (c)(1),
(2), (4) Date: Mar. 14, 2013

(87) PCT Pub. No.: WO2012/043407
PCT Pub. Date: Apr. 5, 2012

(65) Prior Publication Data
US 2013/0176495 A1    Jul. 11, 2013

(30) Foreign Application Priority Data

Sep. 29, 2010 (JP) .................................. 2010-219711

(51) Int. Cl.
*H04N 5/21* (2006.01)
*G06T 5/00* (2006.01)
(52) U.S. Cl.
USPC .......................................... 348/629; 382/266
(58) Field of Classification Search
USPC ................. 348/241, 252, 606, 625, 627–629; 382/263, 266, 275; 345/589, 606; 358/3.27
See application file for complete search history.

(56) References Cited

U.S. PATENT DOCUMENTS

| 6,658,379 | B1 | 12/2003 | Ogata |
| 7,633,354 | B2 | 12/2009 | Kuijk et al. |
| 2002/0181583 | A1 | 12/2002 | Corbera |
| 2003/0151684 | A1 | 8/2003 | Shimazaki et al. |

(Continued)

FOREIGN PATENT DOCUMENTS

| JP | 7-184085 A | 7/1995 |
| JP | 7-312704 A | 11/1995 |

(Continued)

OTHER PUBLICATIONS

Official Communication issued in International Patent Application No. PCT/JP2011/071706, mailed on Dec. 20, 2011.

(Continued)

*Primary Examiner* — Victor Kostak
(74) *Attorney, Agent, or Firm* — Keating & Bennett, LLP

(57) ABSTRACT

A signal processing device (500a) subjects an input signal indicating an image to a process of sharpening the image and outputs a signal indicating the sharpened image, and includes: a two-dimensional filter (200) for removing, from the input signal, a high frequency component of frequency components in directions other than horizontal/vertical directions of the image indicated by the input signal, to generate an obliquely reduced signal; a sharpening process section (100A) for generating a sharpened signal (S101) by a nonlinear process section (102) performing a nonlinear process on a signal indicating pixels adjacently aligned in a horizontal direction of an image indicated by the obliquely reduced signal; and a sharpening process section (100B) for generating a sharpened signal (S102) by a nonlinear process section (102) performing a nonlinear process on a signal indicating pixels adjacently aligned in a vertical direction of an image indicated by the sharpened signal (S101).

15 Claims, 23 Drawing Sheets

(56) References Cited

U.S. PATENT DOCUMENTS

| | | | |
|---|---|---|---|
| 2003/0210829 A1* | 11/2003 | Someya et al. | 382/263 |
| 2003/0218776 A1 | 11/2003 | Morimoto et al. | |
| 2004/0252907 A1 | 12/2004 | Ito | |
| 2005/0008251 A1* | 1/2005 | Chiang | 382/266 |
| 2005/0123214 A1 | 6/2005 | Takahira | |
| 2006/0239361 A1 | 10/2006 | Iguchi et al. | |
| 2007/0140387 A1 | 6/2007 | Wong et al. | |
| 2007/0147478 A1 | 6/2007 | Lai et al. | |
| 2007/0269137 A1 | 11/2007 | Ida et al. | |
| 2008/0199101 A1* | 8/2008 | Sumiya et al. | 382/266 |
| 2010/0119176 A1* | 5/2010 | Ichihashi et al. | 382/300 |
| 2011/0279730 A1 | 11/2011 | Goshi | |
| 2012/0070098 A1 | 3/2012 | Gohshi | |
| 2012/0081198 A1 | 4/2012 | Gohshi | |

FOREIGN PATENT DOCUMENTS

| | | | |
|---|---|---|---|
| JP | 8-139969 A | 5/1996 | |
| JP | 9-233489 A | 9/1997 | |
| JP | 9-307897 A | 11/1997 | |
| JP | 9-319869 A | 12/1997 | |
| JP | 11-66311 A | 3/1999 | |
| JP | 11-340878 A | 12/1999 | |
| JP | 11-345331 A | 12/1999 | |
| JP | 2001-169116 A | 6/2001 | |
| JP | 2002-125200 A | 4/2002 | |
| JP | 2002-335527 A | 11/2002 | |
| JP | 2003-69859 A | 3/2003 | |
| JP | 2003-101774 A | 4/2003 | |
| JP | 2003-134352 A | 5/2003 | |
| JP | 2003-198878 A | 7/2003 | |
| JP | 2003-283835 A | 10/2003 | |
| JP | 2005-117549 A | 4/2005 | |
| JP | 2005-191895 A | 7/2005 | |
| JP | 2006-157584 A | 6/2006 | |
| JP | 2006-304352 A | 11/2006 | |
| JP | 2006-310934 A | 11/2006 | |
| JP | 2007-174637 A | 7/2007 | |
| JP | 2007-265122 A | 10/2007 | |
| JP | 2007-310837 A | 11/2007 | |
| JP | 2008-103785 A | 5/2008 | |
| JP | 2009-198935 A | 9/2009 | |
| WO | 98/35449 A1 | 8/1998 | |
| WO | 02/084997 A1 | 10/2002 | |
| WO | 2007/078829 A1 | 7/2007 | |
| WO | 2010/113342 A1 | 10/2010 | |
| WO | 2010/140281 A1 | 12/2010 | |
| WO | 2010/146728 A1 | 12/2010 | |
| WO | 2011/061958 A1 | 5/2011 | |

OTHER PUBLICATIONS

Matsumoto et al., "A study on One Frame Reconstruction-based Super-resolution Using Image Segmentation", The Institute of Electronics, Information and Communication Engineers (IEICE), IEICE technical report, vol. 108(4), IE2008-6, pp. 31-36, Apr. 2008.

Vese et al., "Modeling textures with total variation minimization and oscillating patterns in image processing", Journal of Scientific Computing, vol. 19, Nos. 1-3, pp. 1-23, Dec. 2003.

Aoki et al., "Wavelet transform coding by zero value tree structure and vector quantization", Picture Coding Symposium of Japan, Proceedings of the 16th Symposium, pp. 95 and 96, Nov. 14, 2001.

Gohshi et al., "A Novel Super Resolution Method with Non-Linear Function", Forum on Information Technology, 2009, pp. 7-12, Sep. 2-4, 2009.

Gohshi, "A New Signal Processing Method for VIDEO—Reproduce the Frequency Spectrum Exceeding the Nyquist Frequency-", Multimedia System Conference, 6 pages, presented Feb. 22, 2012.

Official Communication issued in International Patent Application No. PCT/JP2010/000372, mailed on Apr. 6, 2010.

Official Communication issued in International Patent Application No. PCT/JP2010/000299, mailed on Mar. 9, 2010.

Official Communication issued in International Patent Application No. PCT/JP2010/069841, mailed on Dec. 7, 2010.

Gohshi; "Waveform Shaping Device, Equalizer, Receiving System, Method of Controlling Waveform Shaping Device, Control Program, and Computer-Readable Medium in Which Control Program Is Recorded"; U.S. Appl. No. 13/377,907, filed Dec. 13, 2011.

Gohshi; "Signal Processing Device, Control Method for Signal Processing Device, Control Program, and Computer-Readable Storage Medium Having the Control Program Recorded Therein"; U.S. Appl. No. 13/375,251, filed Nov. 30, 2011.

Gohshi; "Decoding Device, Control Method for a Decoding Device, Transmission System, and Computer-Readable Recording Medium Having a Control Program Recorded Thereon"; U.S. Appl. No. 13/504,351, filed Apr. 26, 2012.

Gohshi; "Signal Processing Device and Control Program"; U.S. Appl. No. 13/577,953, filed Aug. 9, 2012.

Gohshi, "Encoding Device, Decoding Device, Control Method for an Encoding Device, Control Method for a Decoding Device, Transmission System, and Computer-Readable Recording Medium Having a Control Program Recorded Thereon," U.S. Appl. No. 13/504,796, filed Apr. 27, 2012.

Goshi, "Image Enhancing Device, Image Enhancing Method, Image Enhancing Program and Signal Processing Device," U.S. Appl. No. 13/138,197, filed Jul. 19, 2011.

* cited by examiner

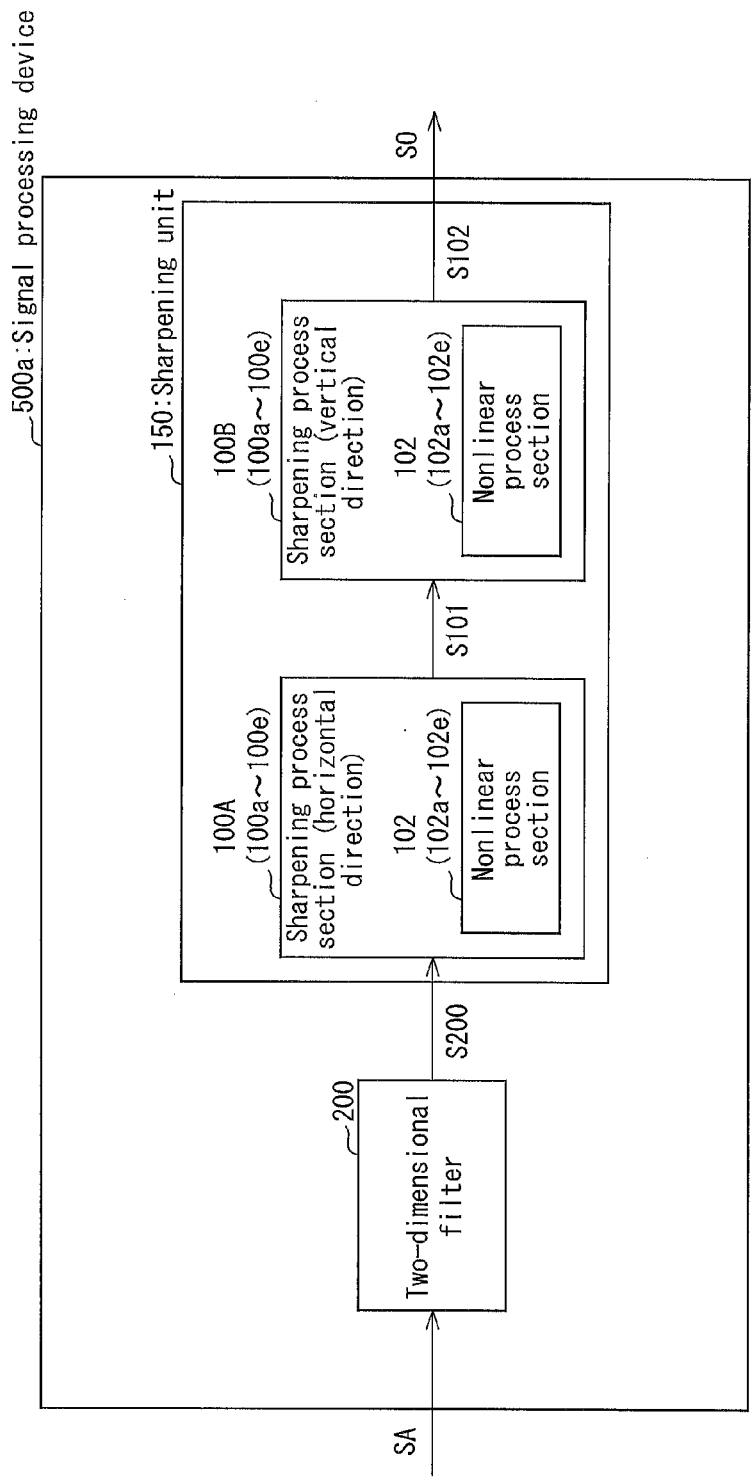
F I G. 1

F I G. 3
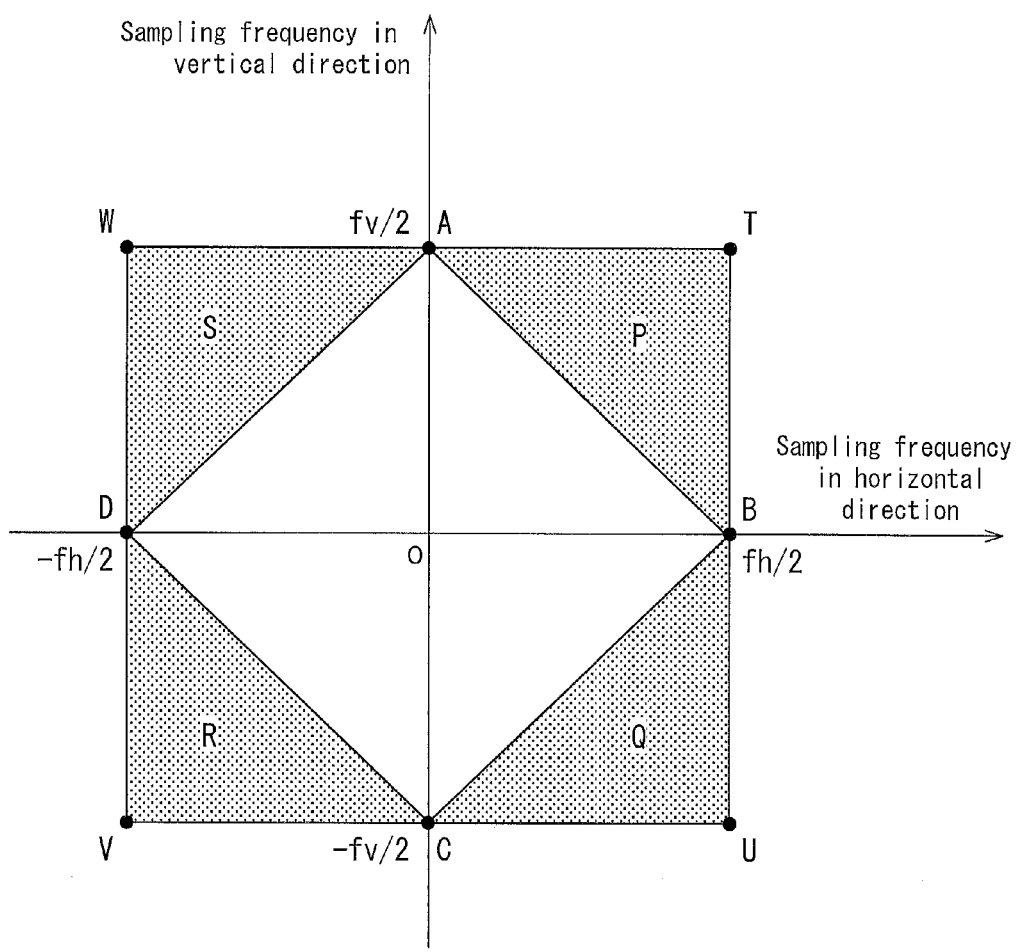

F I G. 1 2
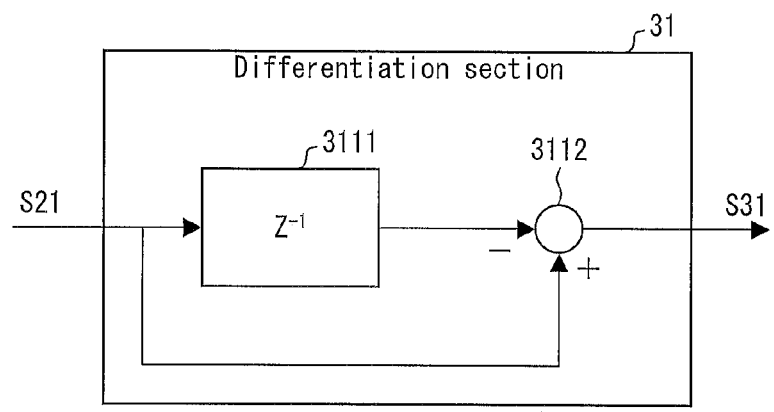

F I G. 1 4
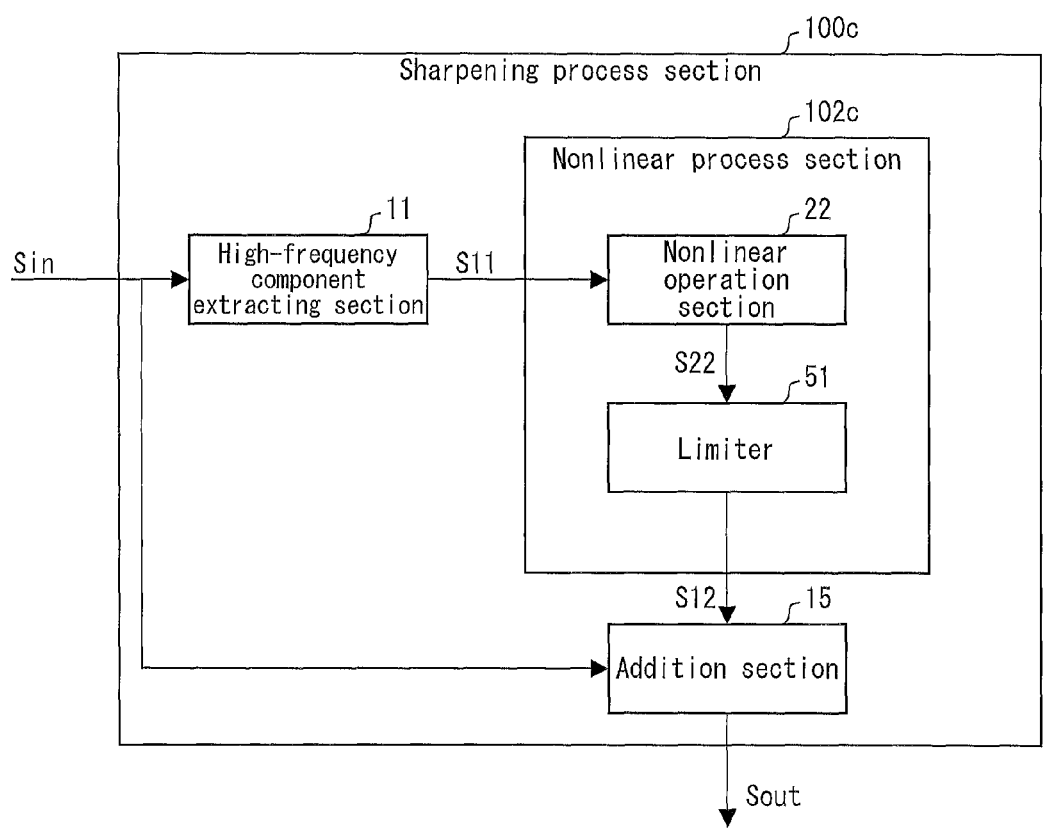

F I G. 2 2
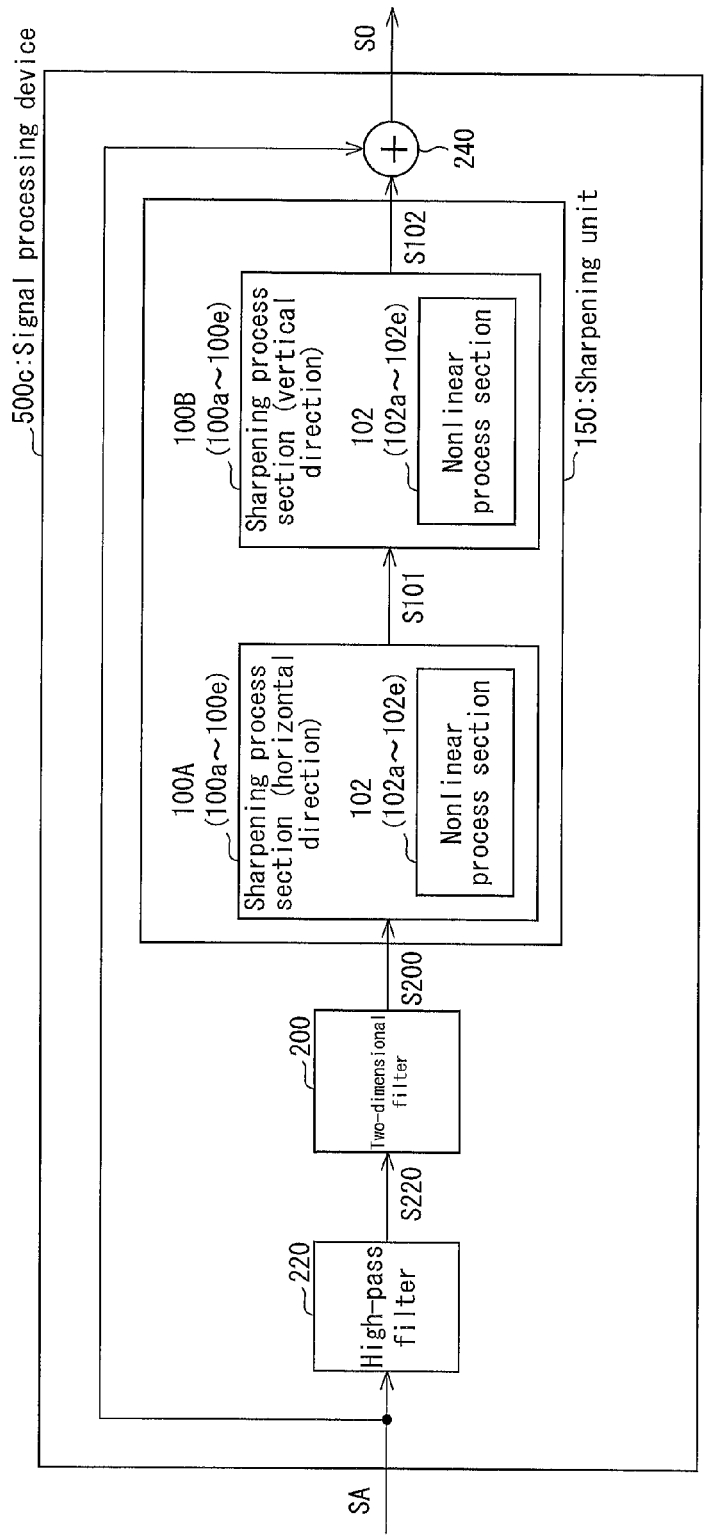

SIGNAL PROCESSING DEVICE, AND INTEGRATED CIRCUIT INCLUDING OBLIQUE LOWPASS FILTERING AND MULTIPLE SHARPENING COMPONENTS

TECHNICAL FIELD

The present invention relates to a signal processing device etc. that improves image quality by sharpening an image.

BACKGROUND ART

Conventional image processing devices etc. carry out a process for sharpening an image (hereinafter referred to as sharpening process) in order to improve image quality of the image. For example, conventional television receivers carry out contour compensation for steepening rising and falling of an image signal corresponding to a contour portion of an image to be displayed by the television receivers. The contour compensation is carried out in such a manner that a high frequency component of an image signal (luminance signal) inputted to a display of a television receiver is extracted and the extracted high frequency component is amplified and added to the input image signal. This improves frequency characteristics of an image signal that is likely to be deteriorated while processed in individual circuits of the television receiver, thereby improving apparent image quality.

An example of a technique related to improvement in deterioration of image quality is a technique disclosed in Patent Literature 1. The technique disclosed in Patent Literature 1 is a technique for increasing a ratio of coding an image signal by using a spatio-temporal filter and an enhancer using linear operation.

CITATION LIST

Patent Literatures

[Patent Literature 1]
Japanese Patent Application Publication, Tokukai, No. 2006-310934 (published on Nov. 9, 2006)

SUMMARY OF INVENTION

Technical Problem

However, the sharpening process in the conventional art is a process for carrying out linear operation with respect to an image signal to be processed. Consequently, in the sharpening process in the conventional art, although a frequency component in the vicinity of Nyquist frequency fs/2 which is a frequency of ½ of a sampling frequency fs is increased, a frequency component higher than the Nyquist frequency fs/2 (high frequency component which is not included in an image signal to be processed) cannot be used. Therefore, particularly in a process of enlarging an image, image quality cannot be improved sufficiently.

For example, assume a case where an image whose resolution is not more than half of a full high-definition, which image is displayed in a conventional analog television etc., is subjected to an enlargement process and then displayed in a display of a television receiver of a high definition television (HDTV) (having a full high-definition of 1080×1920 pixels). Even if the image signal having been subjected to the enlargement process is subjected to the sharpening process in the conventional art, it is impossible to extract a frequency component in the vicinity of a Nyquist frequency Fbs/2 from the image signal having been subjected to the enlargement process (a sampling frequency Fbs of the image signal having been subjected to the enlargement process is twice of the sampling frequency fs (Fbs=2fs)). Consequently, even if the image having been subjected to the enlargement process is subjected to the sharpening process in the conventional art, the image is displayed blurrily.

As disclosed in Patent Literature 1, by subjecting an image to the sharpening process after attenuating high frequency components in oblique directions other than the horizontal and vertical directions of the image by use of the spatio-temporal filter, it is possible to subdue a phenomenon in which an oblique line of the image having been subjected to the sharpening process looks glaring. However, also in this case, image quality of the image in the horizontal and vertical directions cannot be improved sufficiently for the above reason.

The present invention was made in view of the foregoing problem. An object of the present invention is to provide a signal processing device, a control program, and an integrated circuit, each capable of highly sharpening an image with a simple configuration.

Solution to Problem

In order to solve the foregoing problem, a signal processing device of the present invention is a signal processing device for subjecting an input signal indicative of an image to a process of sharpening the image and outputting a signal indicative of the sharpened image, including:

high frequency component removing means for removing, from the input signal, a high frequency component out of frequency components in directions other than a horizontal direction and a vertical direction of the image indicated by the input signal, so as to generate an obliquely reduced signal; and sharpening means for receiving the obliquely reduced signal and outputting a sharpened signal obtained by sharpening the obliquely reduced signal, the sharpening means including:
horizontal sharpening means for outputting a horizontal sharpened signal obtained by sharpening a signal indicative of a pixel group constituted by pixels adjacently aligned in a horizontal direction of an image indicated by an incoming signal; and
vertical sharpening means for outputting a vertical sharpened signal obtained by sharpening a signal indicative of a pixel group constituted by pixels adjacently aligned in a vertical direction of an image indicated by an incoming signal,
the horizontal sharpening means and the vertical sharpening means being cascade-connected with each other,
the obliquely reduced signal being inputted to the horizontal sharpening means or the vertical sharpening means at an upper stage of the cascade-connection,
the sharpening means outputting, as the sharpened signal, a signal outputted from the horizontal sharpening means or the vertical sharpening means at a lower stage of the cascade-connection,
the horizontal sharpening means including:
horizontal low-frequency component removing means for removing at least a direct current component from frequency components in the signal indicative of the pixel group constituted by pixels adjacently aligned in the horizontal direction of the image indicated by the incoming signal, so as to generate and output a horizontal low-frequency-free signal;

horizontal nonlinear process means for receiving the horizontal low-frequency-free signal, generating a horizontal nonlinear process signal (i) in which positive and negative signs of the horizontal low-frequency-free signal are retained and (ii) which broadly monotonically increases nonlinearly with respect to the horizontal low-frequency-free signal when values of the horizontal low-frequency-free signal are at least in the vicinity of 0, and outputting the horizontal nonlinear process signal; and horizontal addition means for adding the incoming signal incoming to the horizontal sharpening means to the horizontal nonlinear process signal, so as to generate the horizontal sharpened signal, and the vertical sharpening means including:

vertical low-frequency component removing means for removing at least a direct current component from frequency components in the signal indicative of the pixel group constituted by pixels adjacently aligned in the vertical direction of the image indicated by the incoming signal, so as to generate and output a vertical low-frequency-free signal;

vertical nonlinear process means for receiving the vertical low-frequency-free signal, generating a vertical nonlinear process signal (i) in which positive and negative signs of the vertical low-frequency-free signal are retained and (ii) which broadly monotonically increases nonlinearly with respect to the vertical low-frequency-free signal when values of the vertical low-frequency-free signal are at least in the vicinity of 0, and outputting the vertical nonlinear process signal; and vertical addition means for adding the incoming signal incoming to the vertical sharpening means to the vertical nonlinear process signal, so as to generate the vertical sharpened signal.

An integrated circuit of the present invention is an integrated circuit for subjecting an input signal indicative of an image to a process of sharpening the image and outputting a signal indicative of the sharpened image, including:

a high frequency component removing circuit for removing, from the input signal, a high frequency component out of frequency components in directions other than a horizontal direction and a vertical direction of the image indicated by the input signal, so as to generate an obliquely reduced signal; and a sharpening circuit for receiving the obliquely reduced signal and outputting a sharpened signal obtained by sharpening the obliquely reduced signal, the sharpening circuit including:

a horizontal sharpening circuit for outputting a horizontal sharpened signal obtained by sharpening a signal indicative of a pixel group constituted by pixels adjacently aligned in a horizontal direction of an image indicated by an incoming signal; and a vertical sharpening circuit for outputting a vertical sharpened signal obtained by sharpening a signal indicative of a pixel group constituted by pixels adjacently aligned in a vertical direction of an image indicated by an incoming signal, the horizontal sharpening circuit and the vertical sharpening circuit being cascade-connected with each other, the obliquely reduced signal being inputted to the horizontal sharpening circuit or the vertical sharpening circuit at an upper stage of the cascade-connection, the sharpening circuit outputting, as the sharpened signal, a signal outputted from the horizontal sharpening circuit or the vertical sharpening circuit at a lower stage of the cascade-connection, the horizontal sharpening circuit including:

a horizontal low-frequency component removing circuit for removing at least a direct current component from frequency components in the signal indicative of the pixel group constituted by pixels adjacently aligned in the horizontal direction of the image indicated by the incoming signal, so as to generate and output a horizontal low-frequency-free signal;

a horizontal nonlinear process circuit for receiving the horizontal low-frequency-free signal, generating a horizontal nonlinear process signal (i) in which positive and negative signs of the horizontal low-frequency-free signal are retained and (ii) which broadly monotonically increases nonlinearly with respect to the horizontal low-frequency-free signal when values of the horizontal low-frequency-free signal are at least in the vicinity of 0, and outputting the horizontal nonlinear process signal; and a horizontal addition circuit for adding the incoming signal incoming to the horizontal sharpening circuit to the horizontal nonlinear process signal, so as to generate the horizontal sharpened signal, and the vertical sharpening circuit including:

a vertical low-frequency component removing circuit for removing at least a direct current component from frequency components in the signal indicative of the pixel group constituted by pixels adjacently aligned in the vertical direction of the image indicated by the incoming signal, so as to generate and output a vertical low-frequency-free signal;

a vertical nonlinear process circuit for receiving the vertical low-frequency-free signal, generating a vertical nonlinear process signal (i) in which positive and negative signs of the vertical low-frequency-free signal are retained and (ii) which broadly monotonically increases nonlinearly with respect to the vertical low-frequency-free signal when values of the vertical low-frequency-free signal are at least in the vicinity of 0, and outputting the vertical nonlinear process signal; and a vertical addition circuit for adding the incoming signal incoming to the vertical sharpening circuit to the vertical nonlinear process signal, so as to generate the vertical sharpened signal.

With the arrangement, a high frequency component out of frequency components in directions other than a horizontal direction and a vertical direction of an image indicated by an input signal is removed from the input signal so as to generate an obliquely reduced signal, and the obliquely reduced signal is sequentially subjected to two sharpening processes and a sharpened signal is outputted.

One of the two sharpening processes is a process for generating a horizontal sharpened signal which is a harmonic obtained by sharpening a signal indicative of a pixel group constituted by pixels adjacently aligned in a horizontal direction of an image indicated by an incoming signal. In generation of the horizontal sharpened signal, initially, at least a direct current component is removed from frequency components in the signal indicative of the pixel group constituted by pixels adjacently aligned in the horizontal direction of the image indicated by the incoming signal, so as to generate a horizontal low-frequency-free signal. Then, a horizontal nonlinear process signal (i) in which positive and negative signs of the horizontal low-frequency-free signal are retained and (ii) which broadly monotonically increases nonlinearly with respect to the horizontal low-frequency-free signal when values of the horizontal low-frequency-free signal are at least in the vicinity of 0 is generated. Then, the incoming signal is added to the horizontal low-frequency-free signal so as to generate the horizontal sharpened signal.

The other of the two sharpening processes is a process for generating a vertical sharpened signal which is a harmonic obtained by sharpening a signal indicative of a pixel group constituted by pixels adjacently aligned in a vertical direction of an image indicated by an incoming signal. In generation of the vertical sharpened signal, initially, at least a direct current component is removed from frequency components in the signal indicative of the pixel group constituted by pixels adjacently aligned in the vertical direction of the image indicated by the incoming signal, so as to generate a vertical low-frequency-free signal. Then, a vertical nonlinear process signal (i) in which positive and negative signs of the vertical low-frequency-free signal are retained and (ii) which broadly monotonically increases nonlinearly with respect to the vertical low-frequency-free signal when values of the vertical low-frequency-free signal are at least in the vicinity of 0 is generated. Then, the incoming signal is added to the vertical low-frequency-free signal so as to generate the vertical sharpened signal.

Therefore, by carrying out the two sharpening processes, it is possible to output, as a sharpened signal, a signal obtained by carrying out a nonlinear process on frequency components in horizontal and vertical directions of an image indicated by an obliquely reduced signal without carrying out a nonlinear process on frequency components in directions other than the horizontal and vertical directions of the image.

The horizontal sharpened signal is generated by adding the incoming signal to the horizontal nonlinear process signal having been subjected to a nonlinear process such as squaring the horizontal low-frequency-free signal. The generated signal retains positive and negative signs of the horizontal low-frequency-free signal.

Similarly, the vertical sharpened signal is generated by adding the incoming signal to the vertical nonlinear process signal having been subjected to a nonlinear process such as squaring the vertical low-frequency-free signal. The generated signal retains positive and negative signs of the vertical low-frequency-free signal.

Therefore, the horizontal sharpened signal and the vertical sharpened signal include frequency components at high bandwidth which are not included in the obliquely reduced signal. Consequently, the horizontal sharpened signal and the vertical sharpened signal include frequency components higher than a Nyquist frequency which is ½ of a sampling frequency when the obliquely reduced signal is made discrete.

Therefore, the signal processing device of the present invention and the integrated circuit of the present invention can steepen rising and falling of a signal corresponding to an edge portion of a frequency component in a horizontal direction and a vertical direction of an image while attenuating frequency components in oblique directions of the image. In particular, the signal processing device of the present invention and the integrated circuit of the present invention can more highly steepen rising and falling of a signal corresponding to the edge portion compared to a conventional sharpening process using linear operation.

Consequently, the signal processing device of the present invention and the integrated circuit of the present invention can more highly (strongly) sharpen an image in horizontal and vertical directions compared to the conventional art while subduing the phenomenon that the oblique line of the sharpened image looks glaring, thereby greatly improving image quality and giving feeling that resolution is increased.

It is generally known that human's eyesight can easily recognize deterioration in resolution in horizontal and vertical directions, whereas has difficulty in recognizing deterioration in resolution in oblique directions. Therefore, deteriorating resolution in oblique directions and then improving resolution in horizontal and vertical directions allows human's eyesight to recognize a higher degree of resolution.

Advantageous Effects of Invention

As described above, the signal processing device of the present invention is a signal processing device for subjecting an input signal indicative of an image to a process of sharpening the image and outputting a signal indicative of the sharpened image, including:

high frequency component removing means for removing, from the input signal, a high frequency component out of frequency components in directions other than a horizontal direction and a vertical direction of the image indicated by the input signal, so as to generate an obliquely reduced signal; and sharpening means for receiving the obliquely reduced signal and outputting a sharpened signal obtained by sharpening the obliquely reduced signal, the sharpening means including:
horizontal sharpening means for outputting a horizontal sharpened signal obtained by sharpening a signal indicative of a pixel group constituted by pixels adjacently aligned in a horizontal direction of an image indicated by an incoming signal; and
vertical sharpening means for outputting a vertical sharpened signal obtained by sharpening a signal indicative of a pixel group constituted by pixels adjacently aligned in a vertical direction of an image indicated by an incoming signal,
the horizontal sharpening means and the vertical sharpening means being cascade-connected with each other,
the obliquely reduced signal being inputted to the horizontal sharpening means or the vertical sharpening means at an upper stage of the cascade-connection,
the sharpening means outputting, as the sharpened signal, a signal outputted from the horizontal sharpening means or the vertical sharpening means at a lower stage of the cascade-connection,
the horizontal sharpening means including:
horizontal low-frequency component removing means for removing at least a direct current component from frequency components in the signal indicative of the pixel group constituted by pixels adjacently aligned in the horizontal direction of the image indicated by the incoming signal, so as to generate and output a horizontal low-frequency-free signal;
horizontal nonlinear process means for receiving the horizontal low-frequency-free signal, generating a horizontal nonlinear process signal (i) in which positive and negative signs of the horizontal low-frequency-free signal are retained and (ii) which broadly monotonically increases nonlinearly with respect to the horizontal low-frequency-free signal when values of the horizontal low-frequency-free signal are at least in the vicinity of 0, and outputting the horizontal nonlinear process signal; and
horizontal addition means for adding the incoming signal incoming to the horizontal sharpening means to the horizontal nonlinear process signal, so as to generate the horizontal sharpened signal, and the vertical sharpening means including:

vertical low-frequency component removing means for removing at least a direct current component from frequency components in the signal indicative of the pixel group constituted by pixels adjacently aligned in the vertical direction of the image indicated by the incoming signal, so as to generate and output a vertical low-frequency-free signal;

vertical nonlinear process means for receiving the vertical low-frequency-free signal, generating a vertical nonlinear process signal (i) in which positive and negative signs of the vertical low-frequency-free signal are retained and (ii) which broadly monotonically increases nonlinearly with respect to the vertical low-frequency-free signal when values of the vertical low-frequency-free signal are at least in the vicinity of 0, and outputting the vertical nonlinear process signal; and vertical addition means for adding the incoming signal incoming to the vertical sharpening means to the vertical nonlinear process signal, so as to generate the vertical sharpened signal.

The integrated circuit of the present invention is an integrated circuit for subjecting an input signal indicative of an image to a process of sharpening the image and outputting a signal indicative of the sharpened image, including:

a high frequency component removing circuit for removing, from the input signal, a high frequency component out of frequency components in directions other than a horizontal direction and a vertical direction of the image indicated by the input signal, so as to generate an obliquely reduced signal; and a sharpening circuit for receiving the obliquely reduced signal and outputting a sharpened signal obtained by sharpening the obliquely reduced signal, the sharpening circuit including:

a horizontal sharpening circuit for outputting a horizontal sharpened signal obtained by sharpening a signal indicative of a pixel group constituted by pixels adjacently aligned in a horizontal direction of an image indicated by an incoming signal; and a vertical sharpening circuit for outputting a vertical sharpened signal obtained by sharpening a signal indicative of a pixel group constituted by pixels adjacently aligned in a vertical direction of an image indicated by an incoming signal, the horizontal sharpening circuit and the vertical sharpening circuit being cascade-connected with each other, the obliquely reduced signal being inputted to the horizontal sharpening circuit or the vertical sharpening circuit at an upper stage of the cascade-connection, the sharpening circuit outputting, as the sharpened signal, a signal outputted from the horizontal sharpening circuit or the vertical sharpening circuit at a lower stage of the cascade-connection, the horizontal sharpening circuit including:

a horizontal low-frequency component removing circuit for removing at least a direct current component from frequency components in the signal indicative of the pixel group constituted by pixels adjacently aligned in the horizontal direction of the image indicated by the incoming signal, so as to generate and output a horizontal low-frequency-free signal;

a horizontal nonlinear process circuit for receiving the horizontal low-frequency-free signal, generating a horizontal nonlinear process signal (i) in which positive and negative signs of the horizontal low-frequency-free signal are retained and (ii) which broadly monotonically increases nonlinearly with respect to the horizontal low-frequency-free signal when values of the horizontal low-frequency-free signal are at least in the vicinity of 0, and outputting the horizontal nonlinear process signal; and a horizontal addition circuit for adding the incoming signal incoming to the horizontal sharpening circuit to the horizontal nonlinear process signal, so as to generate the horizontal sharpened signal, and the vertical sharpening circuit including:

a vertical low-frequency component removing circuit for removing at least a direct current component from frequency components in the signal indicative of the pixel group constituted by pixels adjacently aligned in the vertical direction of the image indicated by the incoming signal, so as to generate and output a vertical low-frequency-free signal;

a vertical nonlinear process circuit for receiving the vertical low-frequency-free signal, generating a vertical nonlinear process signal (i) in which positive and negative signs of the vertical low-frequency-free signal are retained and (ii) which broadly monotonically increases nonlinearly with respect to the vertical low-frequency-free signal when values of the vertical low-frequency-free signal are at least in the vicinity of 0, and outputting the vertical nonlinear process signal; and a vertical addition circuit for adding the incoming signal incoming to the vertical sharpening circuit to the vertical nonlinear process signal, so as to generate the vertical sharpened signal.

Therefore, it is possible to output a signal obtained by carrying out a nonlinear process on frequency components in horizontal and vertical directions of an image without carrying out a nonlinear process on frequency components in directions other than the horizontal and vertical directions of the image.

Therefore, it is possible to steepen rising and falling of a signal corresponding to an edge portion of a frequency component in a horizontal direction and a vertical direction of an image while attenuating frequency components in oblique directions of the image. In particular, it is possible to more highly steepen rising and falling of a signal corresponding to the edge portion compared to a conventional sharpening process using linear operation.

For a fuller understanding of the nature and advantages of the invention, reference should be made to the ensuing detailed description taken in conjunction with the accompanying drawings.

BRIEF DESCRIPTION OF DRAWINGS

FIG. 1 is a block diagram illustrating a configuration of a signal processing device in accordance with an embodiment of the present invention.

FIG. 3 is a schematic view illustrating two-dimensional frequency characteristics of a two-dimensional filter included in the signal processing device illustrated in FIG. 1.

Figure 6:
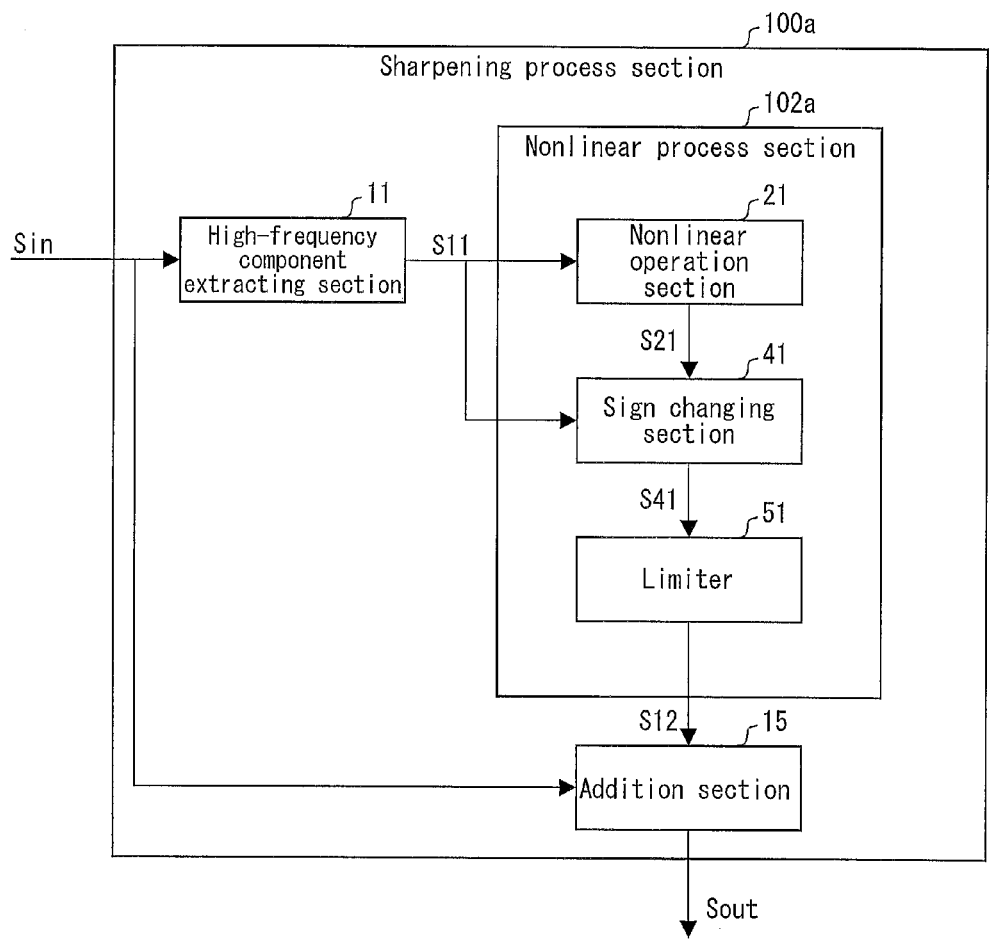
FIG. 6 is a block diagram illustrating a configuration of a sharpening process section included in a signal processing device of the present invention.
Figure 9:
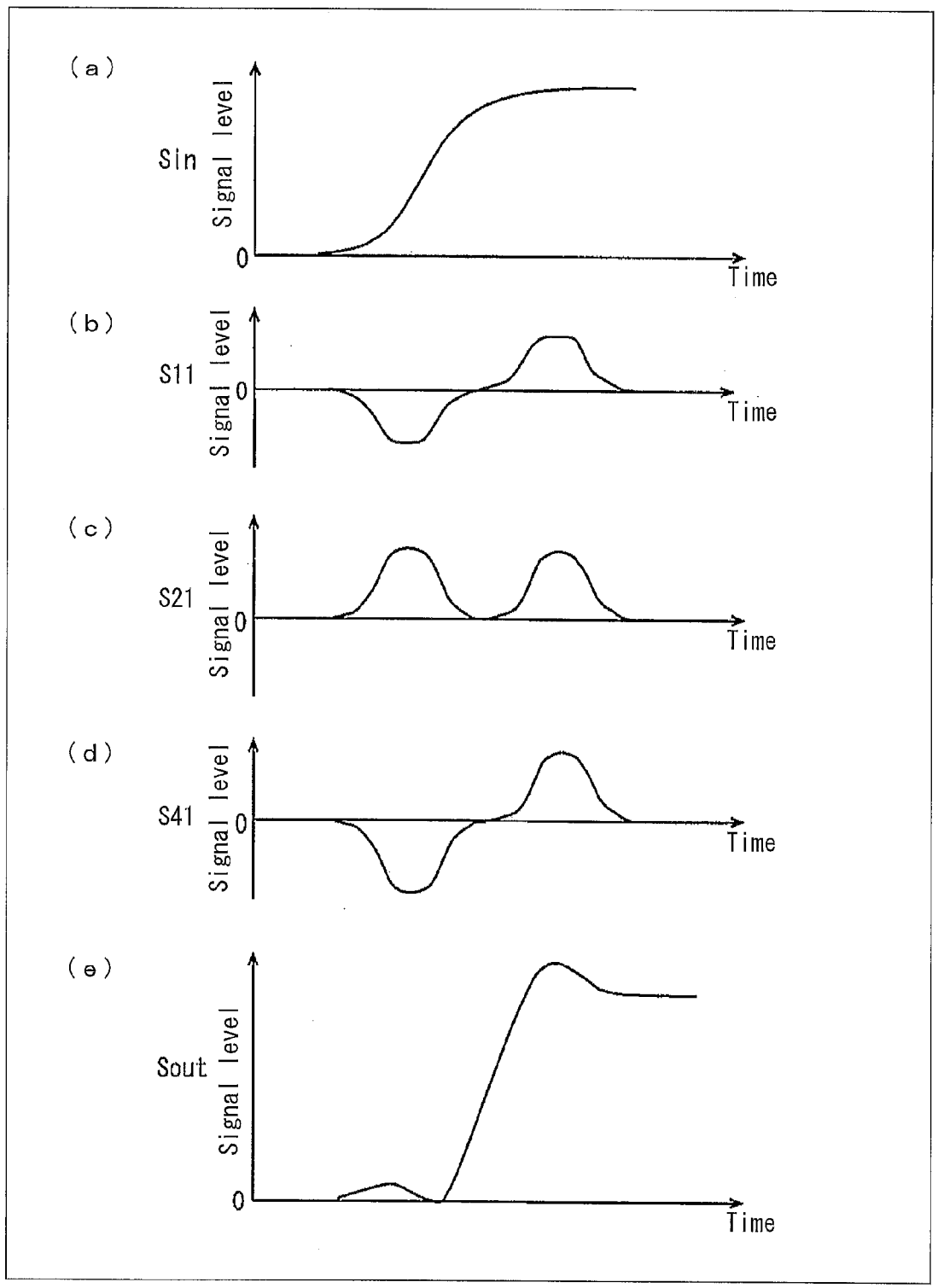

(a) of FIG. 9 is a view schematically illustrating a waveform of a signal inputted to the sharpening process section illustrated in FIG. 6. (b) of FIG. 9 is a view schematically illustrating a waveform of a high-frequency signal generated in the sharpening process section illustrated in FIG. 6. (c) of FIG. 9 is a view schematically illustrating a waveform of a nonlinear signal generated in the sharpening process section illustrated in FIG. 6. (d) of FIG. 9 is a view schematically illustrating a waveform of a sign change signal generated in the sharpening process section illustrated in FIG. 6. (e) of FIG. 9 is a view schematically illustrating a waveform of an output signal generated in the sharpening process section illustrated in FIG. 6.

Figure 10:
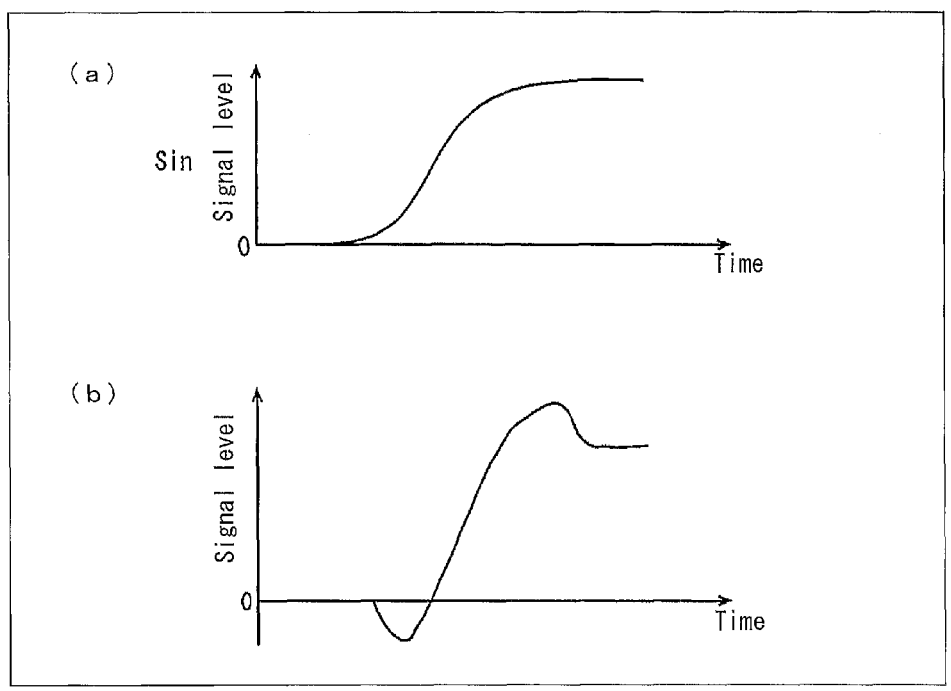

(a) of FIG. 10 is a view schematically illustrating a waveform of a signal inputted to the sharpening process section illustrated in FIG. 6. (b) of FIG. 10 is a view schematically illustrating a waveform obtained by enhancing the signal illustrated in (a) of FIG. 10 by a conventional art.

Figure 11:
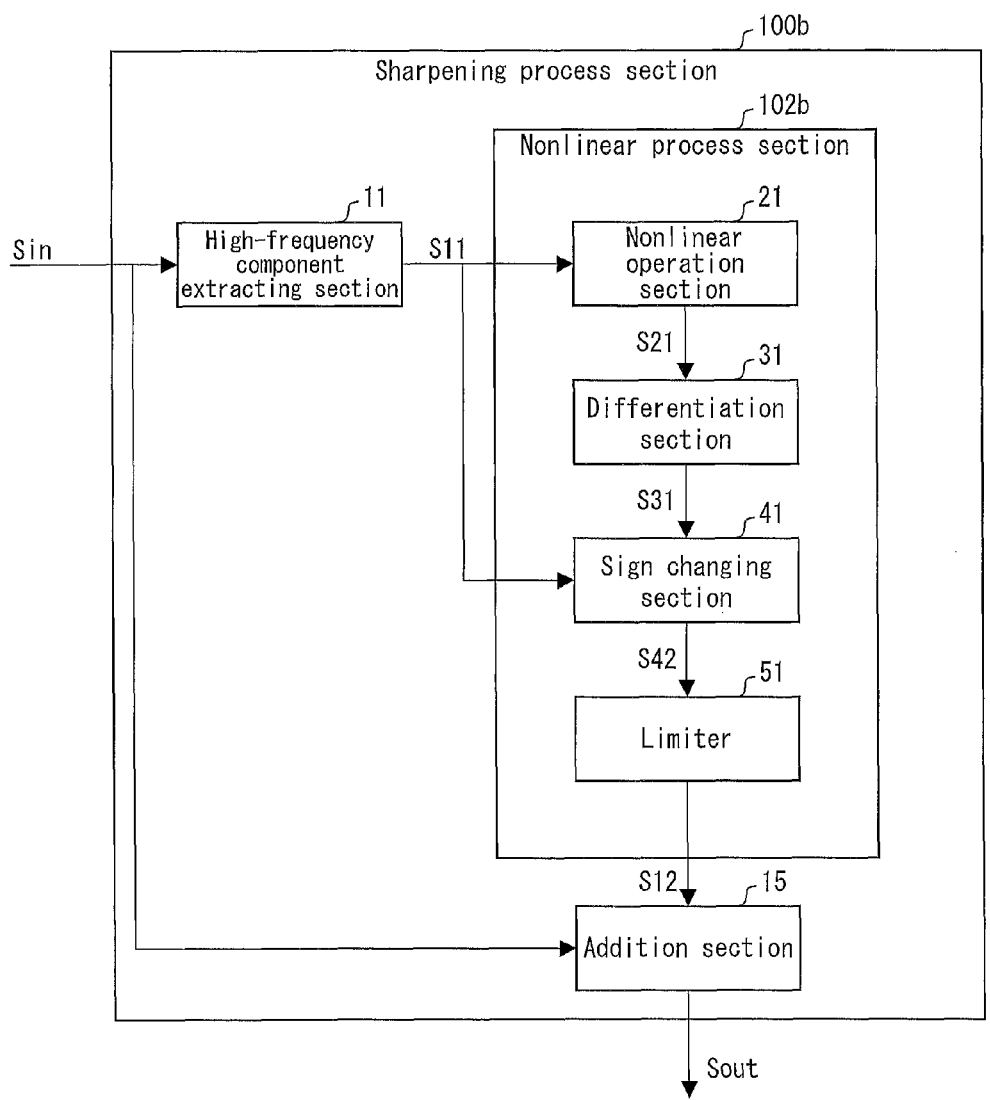

FIG. 11 is a block diagram illustrating another configuration of the sharpening process section included in the signal processing device of the present invention.

FIG. 12 is a block diagram illustrating a configuration of a differentiation section included in the sharpening process section illustrated in FIG. 11.

Figure 13:
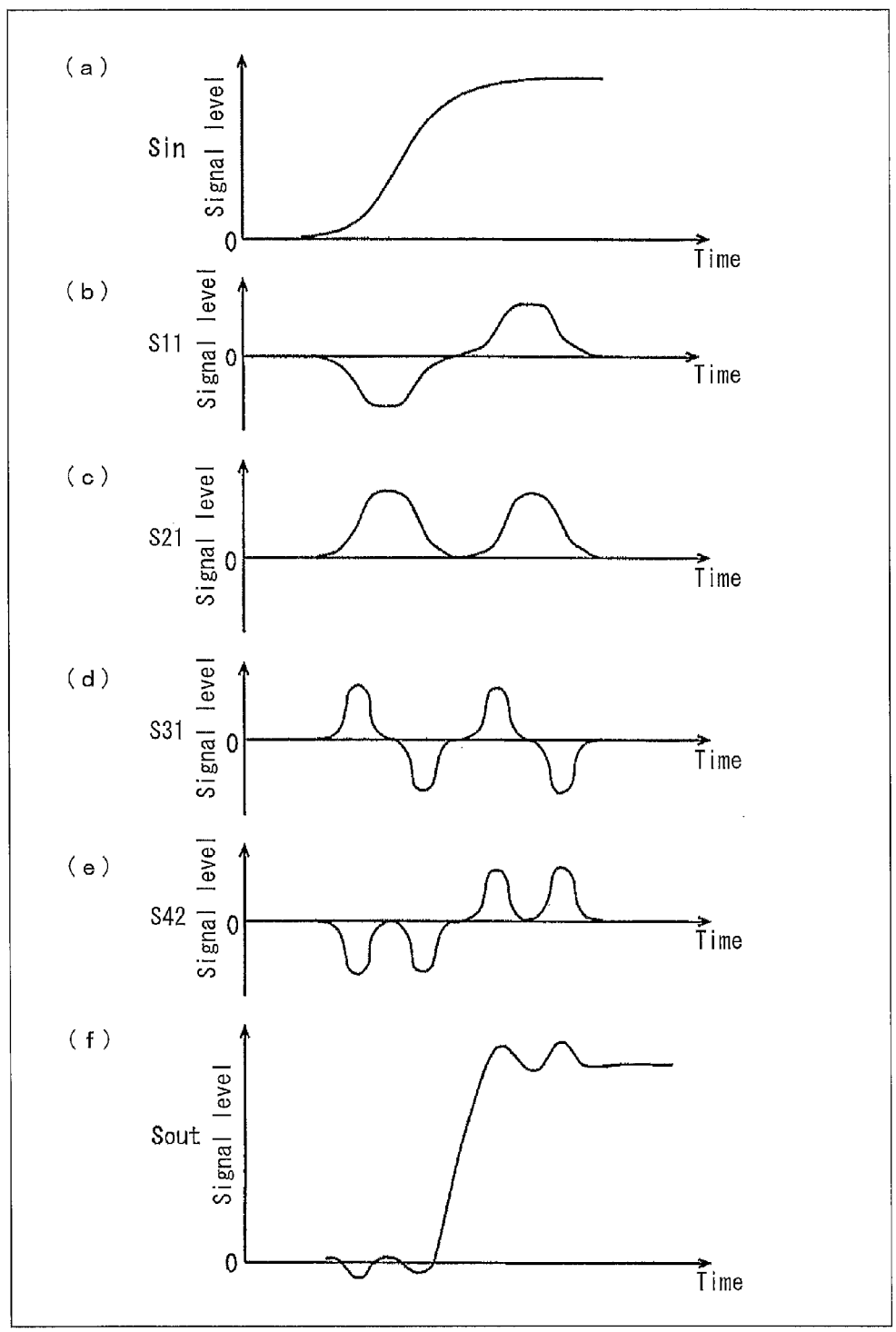

(a) of FIG. 13 is a view schematically illustrating a waveform of a signal inputted to the sharpening process section illustrated in FIG. 11. (b) of FIG. 13 is a view schematically illustrating a waveform of a high-frequency signal generated in the sharpening process section illustrated in FIG. 11. (c) of FIG. 13 is a view schematically illustrating a waveform of a nonlinear signal generated in the sharpening process section illustrated in FIG. 11. (d) of FIG. 13 is a view schematically illustrating a waveform of a differential signal generated in the sharpening process section illustrated in FIG. 11. (e) of FIG. 13 is a view schematically illustrating a waveform of a sign change signal generated in the sharpening process section illustrated in FIG. 11. (f) of FIG. 13 is a view schematically illustrating a waveform of an output signal generated in the sharpening process section illustrated in FIG. 11.

FIG. 14 is a block diagram illustrating still another configuration of the sharpening process section included in the signal processing device of the present invention.

Figure 15:
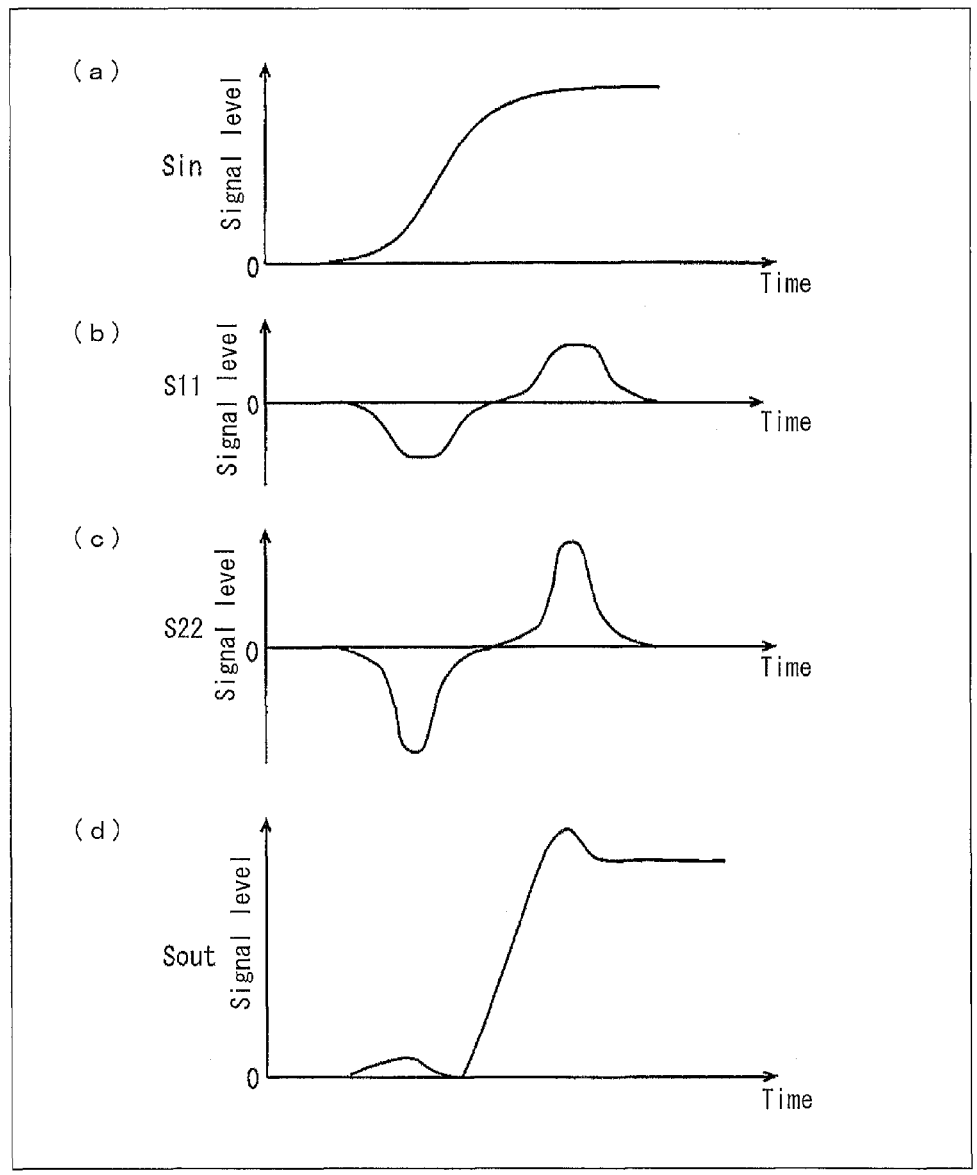

(a) of FIG. 15 is a view schematically illustrating a waveform of a signal inputted to the sharpening process section illustrated in FIG. 14. (b) of FIG. 15 is a view schematically illustrating a waveform of a high-frequency signal generated in the sharpening process section illustrated in FIG. 14. (c) of FIG. 15 is a view schematically illustrating a waveform of a nonlinear signal generated in the sharpening process section illustrated in FIG. 14. (d) of FIG. 15 is a view schematically illustrating a waveform of an output signal generated in the sharpening process section illustrated in FIG. 14.

Figure 16:
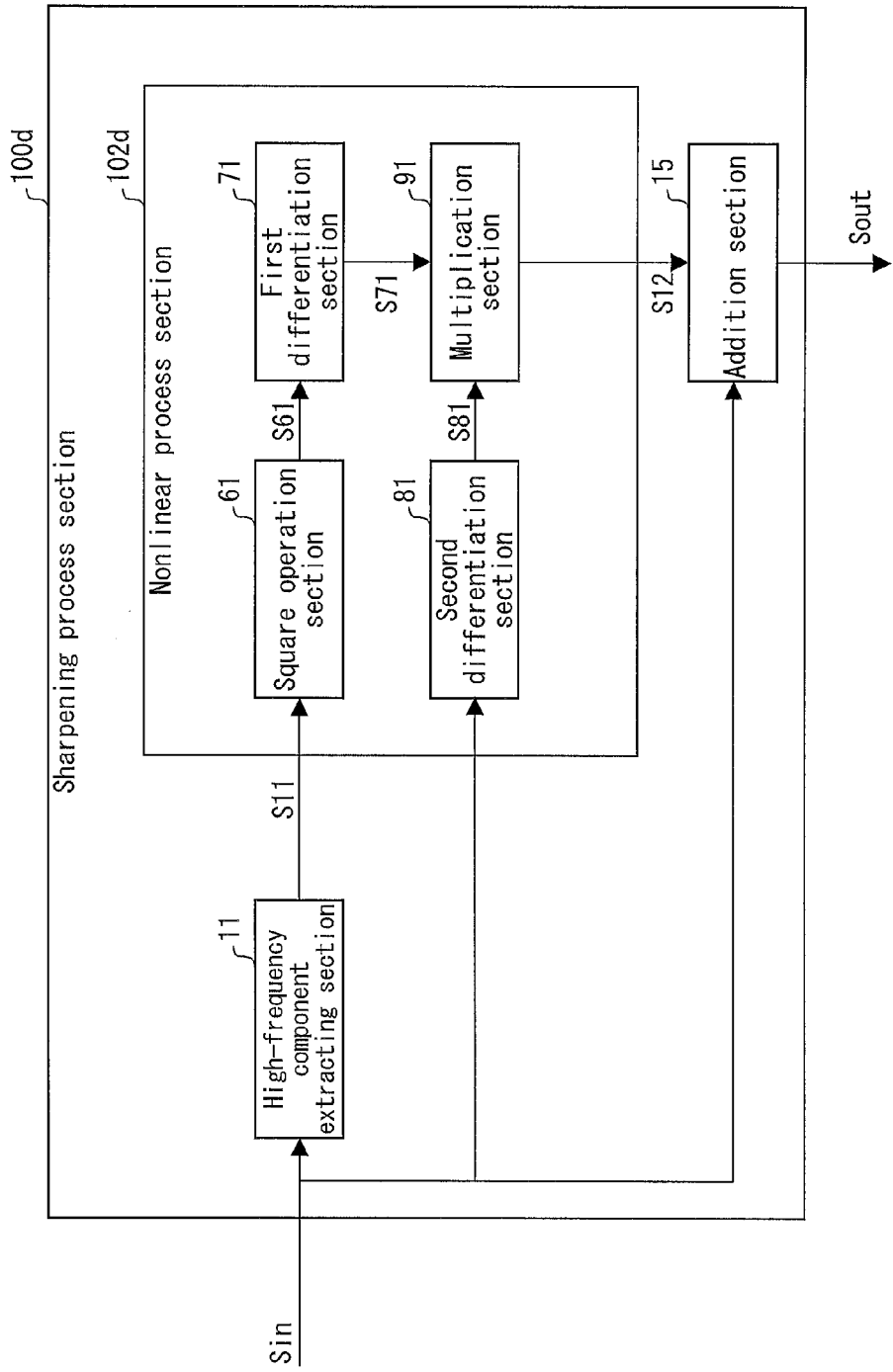

FIG. 16 is a block diagram illustrating still another configuration of the sharpening process section included in the signal processing device of the present invention.

Figure 17:
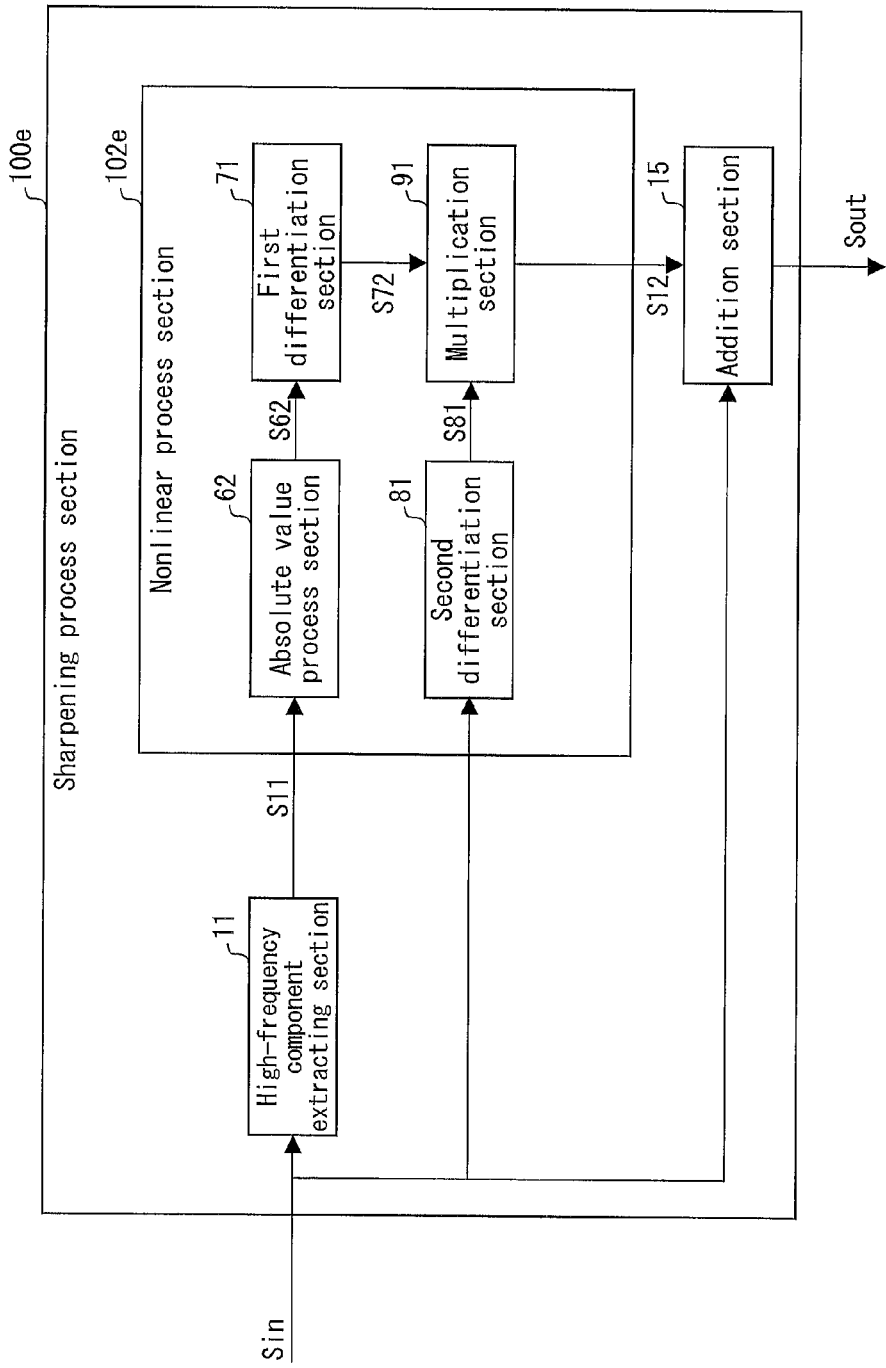

FIG. 17 is a block diagram illustrating still another configuration of the sharpening process section included in the signal processing device of the present invention.

Figure 18:
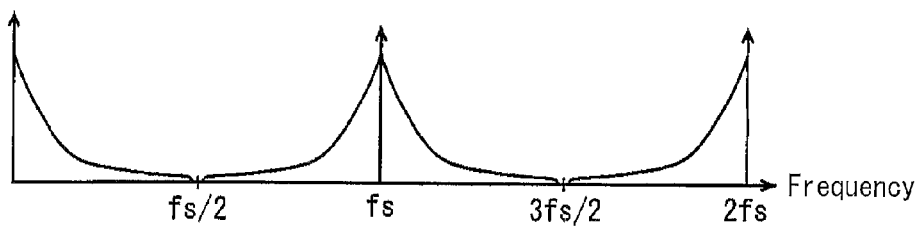

FIG. 18 is a schematic view illustrating a frequency spectrum of an image signal having a sampling frequency fs.

Figure 19:
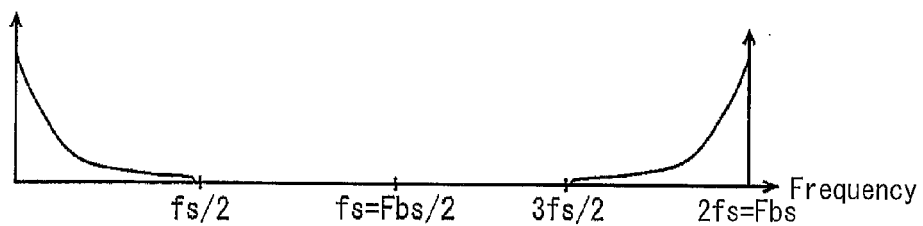

FIG. 19 is a schematic view illustrating a frequency spectrum of an image signal obtained by upconverting an image signal having the frequency spectrum illustrated in FIG. 18 so that the number of pixels in a lateral direction is doubled.

Figure 20:
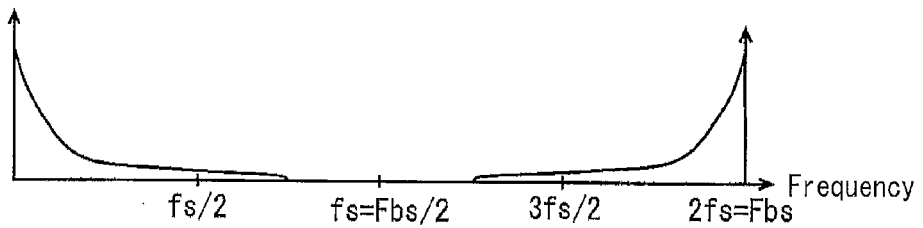

FIG. 20 is a schematic view illustrating a frequency spectrum of an image signal obtained by subjecting an image signal having the frequency spectrum illustrated in FIG. 19 to a sharpening process in the signal processing device illustrated in FIG. 1.

Figure 21:
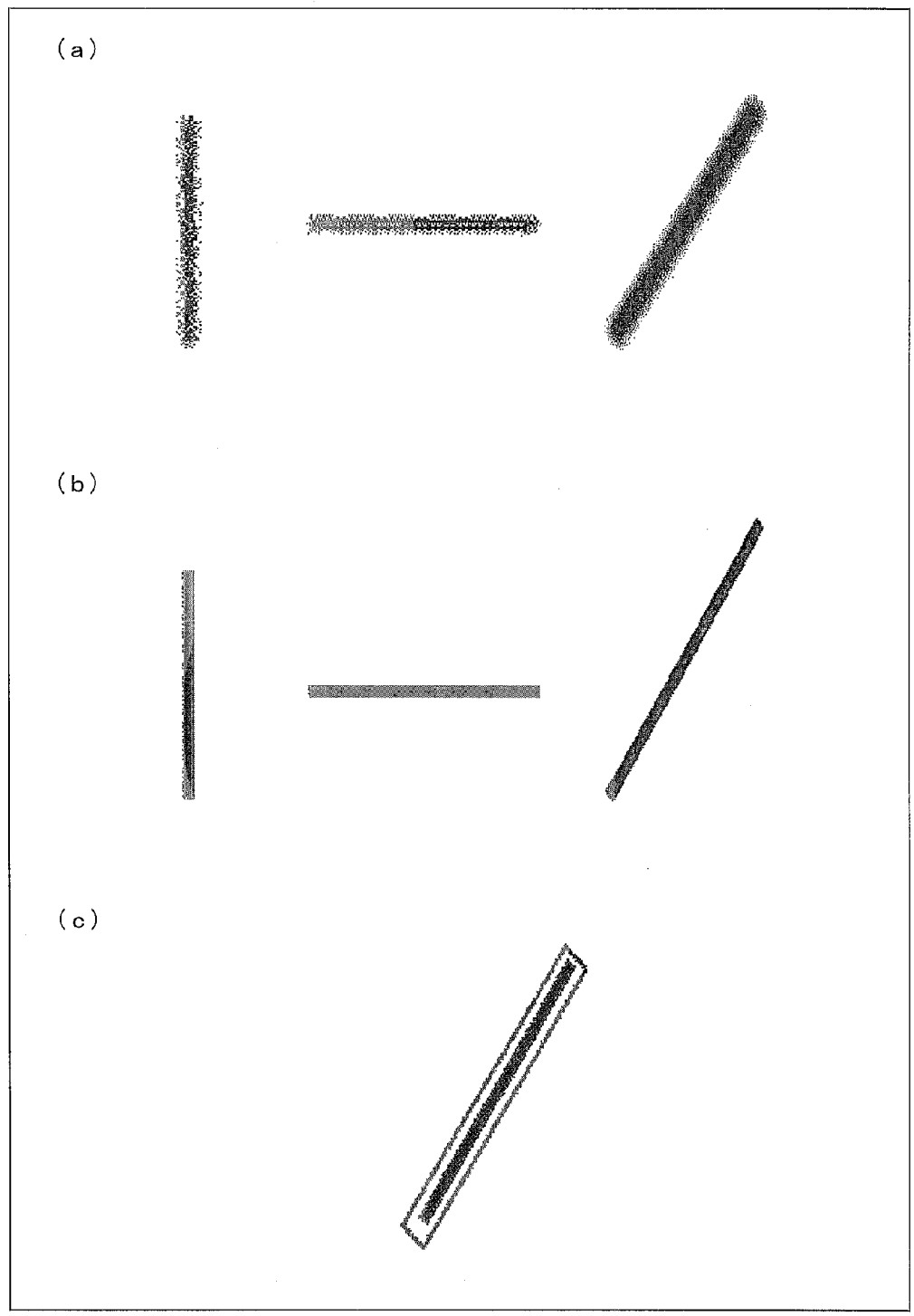

(a) of FIG. 21 is a view illustrating a longitudinal line, a lateral line, and an oblique line included in an image before being sharpened. (b) of FIG. 21 is a view illustrating a longitudinal line, a lateral line, and an oblique line obtained by subjecting the longitudinal line, the lateral line, and the oblique line illustrated in (a) of FIG. 21 to the sharpening process in the signal processing device illustrated in FIG. 1. (c) of FIG. 21 is a view illustrating an oblique line of an image obtained by subjecting the oblique line of the image illustrated in (a) of FIG. 21 to the sharpening process in a sharpening process section of the signal processing device illustrated in FIG. 1 without attenuating a high frequency component of the oblique line in a two-dimensional filter of the signal processing device illustrated in FIG. 1.

FIG. 22 is a block diagram illustrating a configuration of a signal processing device in accordance with another embodiment of the present invention.

Figure 23:
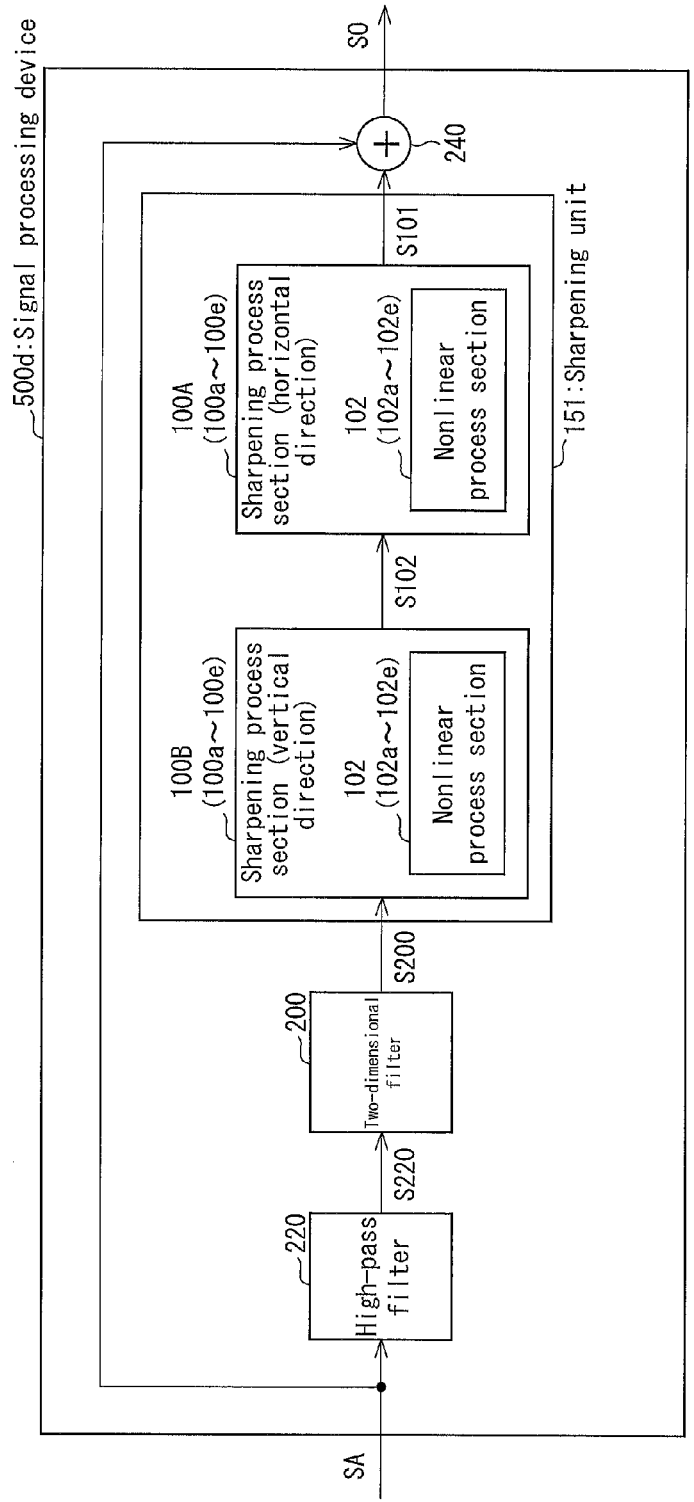

FIG. 23 is a block diagram illustrating a configuration of a modification example of the signal processing device illustrated in FIG. 22.

Figure 24:
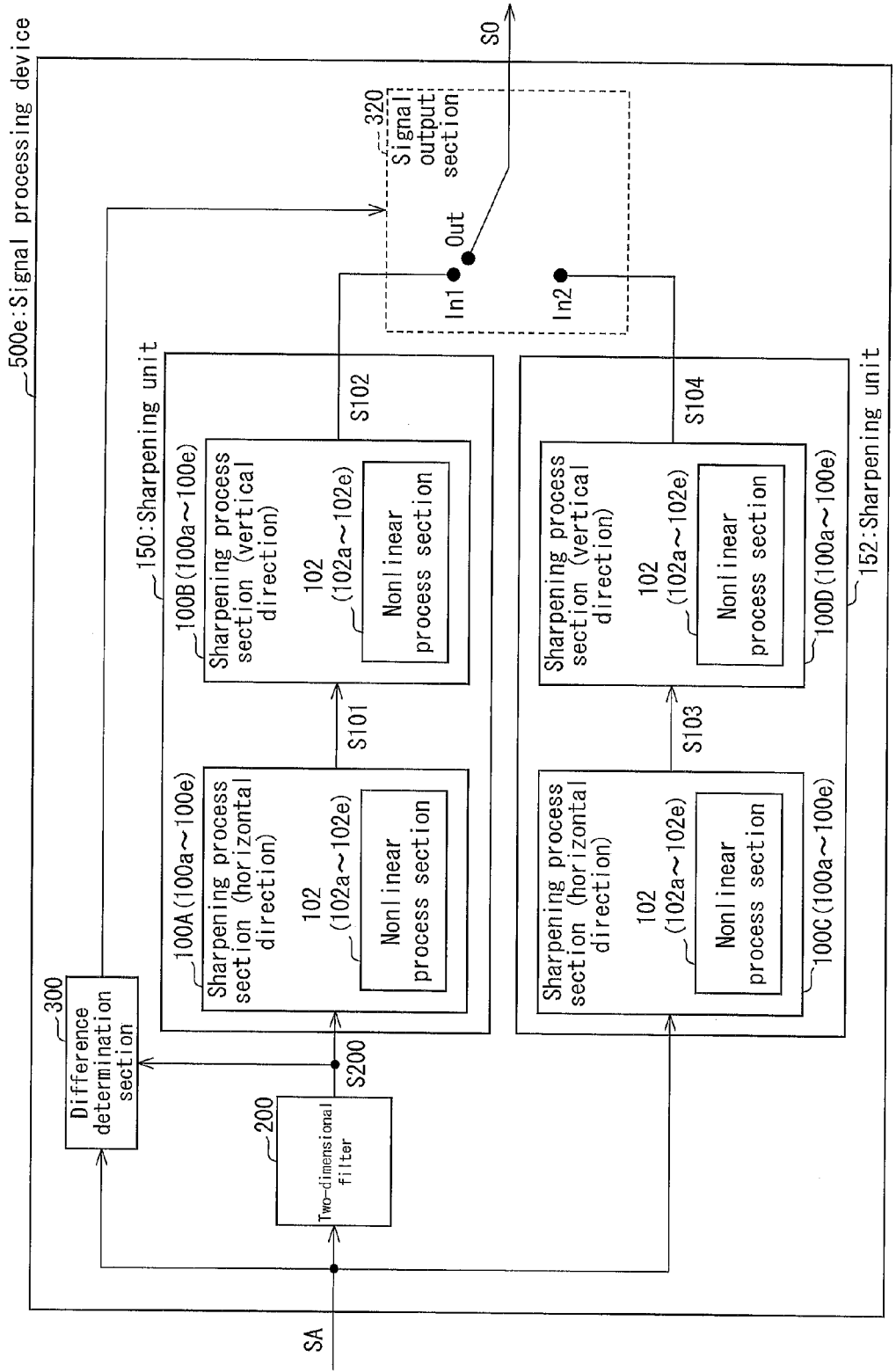

FIG. 24 is a block diagram illustrating a configuration of a signal processing device in accordance with still another embodiment of the present invention.

Figure 25:
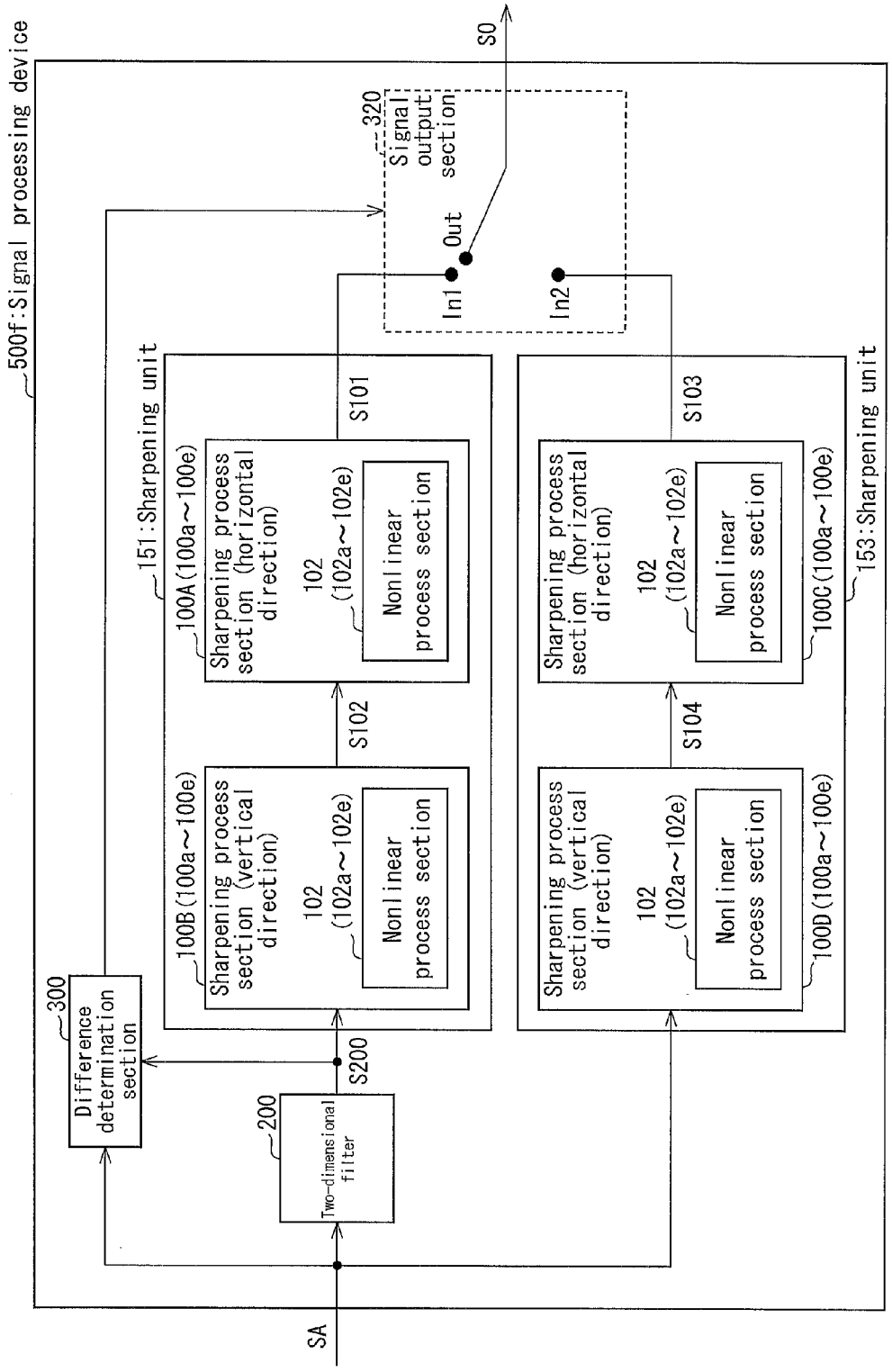

FIG. 25 is a block diagram illustrating a configuration of a modification example of the signal processing device illustrated in FIG. 24.

DESCRIPTION OF EMBODIMENTS (Outline of Signal Processing Device)

Schematically, a signal processing device (integrated circuit) 500 in accordance with embodiments of the present invention is a device for subjecting a frequency component in a horizontal direction (lateral direction, main-scanning direction) of an image and a frequency component in a vertical direction (longitudinal direction, sub-scanning direction) of the image to a sharpening process for sharpening an image.

The sharpening process carried out by the signal processing device 500 is a process for carrying out nonlinear operation with respect to a signal indicative of an image (hereinafter referred to as an image signal) so as to highly steepen (enhance) rising and falling of a signal corresponding to a contour portion (edge) included in the image. The sharpening process carried out by the signal processing device 500 can give an image signal a high frequency component unusable in a conventional sharpening process using linear operation, and accordingly can highly (strongly) sharpen an image compared to the conventional sharpening process. The sharpening process carried out by the signal processing device 500 will be detailed later.

Frequency components in oblique directions other than a horizontal direction and a vertical direction of an image include a frequency component in the horizontal direction and a frequency component in the vertical direction. Accordingly, simply sharpening the frequency component in the horizontal direction of an image and the frequency component in the vertical direction of the image excessively sharpens the frequency components in the oblique directions, so that an edge portion of an oblique line is put in a fringed state (which will be mentioned later with reference to (c) of FIG. 21). That is, simply sharpening the frequency component in the horizontal direction of an image and the frequency component in the vertical direction of the image generally results in a phenomenon that the oblique line looks glaring. The phenomenon that the oblique line looks glaring occurs when sharpening subtitles (superimposed characters) and fine patterns (such as foliage of trees and auditorium in stadium). When the sharpened oblique line moves, a flicker occurs. Therefore, in order to prevent deterioration in image quality, it is necessary to subdue the phenomenon that the oblique line looks glaring.

Since the sharpening process carried out by the signal processing device 500 sharpens a frequency component more highly (strongly) than the conventional sharpening process, simply sharpening the frequency component in the horizontal direction of an image and the frequency component in the vertical direction of the image will more notably cause the phenomenon that the oblique line looks glaring.

In order to deal with this, when carrying out the sharpening process, the signal processing device 500 attenuates frequency components in oblique directions of an image and then carries out the sharpening process with respect to each of a frequency component in a horizontal direction of an image and a frequency component in a vertical direction of the image.

Therefore, the signal processing device 500 can more highly (strongly) sharpen frequency components in horizontal and vertical directions of an image while subduing the phenomenon that the oblique line of the sharpened image looks glaring.

It should be noted that in a case where later-mentioned signal processing devices 500a-500f are not distinguished from each other, they are merely referred to as "signal processing device 500". Hereinafter, an image signal to be inputted to the signal processing device 500 is referred to as an input signal SA. An image signal outputted from the signal processing device 500 is referred to as an output signal SO.

An image indicated by the input signal SA (hereinafter also referred to as original image) may be a still image or may be a moving image. A moving image is displayed in real time by a receiver of SDTV (Standard Definition Television), HDTV (High Definition Television) etc. A moving image consists of a plurality of temporally consecutive frames (screens).

In the following, an explanation is made as to a case where the input signal SA is a data sequence (sequence of pixel values) consisting of pixel values of pixels positioned adjacently in a horizontal direction of an image. Alternatively, the input signal SA may be a data sequence consisting of pixel values of pixels positioned adjacently in a vertical direction of an image.

(Outline of Sharpening Process Section)

Next, an explanation is made as to an outline of a sharpening process section (horizontal sharpening means, vertical sharpening means, horizontal sub-sharpening means, vertical sub-sharpening means, horizontal sharpening circuit, vertical sharpening circuit) 100 which is a main component of the signal processing device 500. The sharpening process section 100 may be any one of later-mentioned sharpening process sections 100a-100e. In a case where the sharpening process sections 100a-100e are not distinguished from each other in the present specification, they are merely referred to as "sharpening process section 100".

The sharpening process section 100 subjects a signal inputted thereto to a sharpening process for sharpening a waveform, and outputs the sharpened signal. Here, the sharpening process is a process for steepening (enhancing) rising and falling of a signal corresponding to a contour portion (edge) included in an image indicated by an input signal.

Hereinafter, a signal inputted to the sharpening process section 100 is also referred to as an input signal Sin. A signal outputted from the sharpening process section 100 is also referred to as an output signal Sout.

As described later, the sharpening process section 100 includes at least a nonlinear process section (horizontal nonlinear process means, vertical nonlinear process means, horizontal sub-nonlinear process means, vertical sub-nonlinear process means, horizontal nonlinear process circuit, vertical nonlinear process circuit) 102. In a case where later-mentioned nonlinear process sections 102a-102e are not distinguished from each other, they are merely referred to as "nonlinear process section 102".

The sharpening process section 100 causes the nonlinear process section 102 to carry out nonlinear operation with respect to a high frequency component of the input signal Sin, so that the sharpening process section 100 can incorporate a high frequency component which is not included in the input signal Sin (specifically, a frequency component higher than Nyquist frequency which is ½ of sampling frequency when the input signal Sin is made discrete) into an output signal Sout. Therefore, by the sharpening process section 100 carrying out the sharpening process, it is possible to further steepen rising and falling of the input signal Sin, compared with a conventional sharpening process using linear operation. It should be noted that the output signal Sout is also referred to as a harmonic of the input signal Sin.

The configuration of the sharpening process section 100 will be detailed later.

First Embodiment

The following explains an embodiment of the present invention with reference to FIGS. 1 to 21. The signal processing device 500 in accordance with the present embodiment is referred to as the signal processing device 500a.

The signal processing device 500a reduces oblique lines in an original image and then carries out the sharpening process with respect to each of horizontal and vertical directions of the original image.

In general, oblique directions of an image are less likely to be seen by human compared with horizontal and vertical directions of the image. Accordingly, even when oblique lines are reduced in the sharpened image, subjective image quality of an image seen by a viewer is not influenced.

(Configuration of Signal Processing Device)

With reference to FIG. 1, an explanation is made as to the configuration of the signal processing device 500a. FIG. 1 is a block diagram illustrating the configuration of the signal processing device 500a. As illustrated in the drawing, the signal processing device 500a includes a two-dimensional filter (high frequency component removing means, high frequency component removing circuit) 200 and a sharpening unit (sharpening means, sharpening circuit) 150.

The two-dimensional filter 200 is a so-called two-dimensional low-pass filter which attenuates high frequency components in oblique directions other than horizontal and vertical directions of an original image indicated by the input signal SA. A signal supplied from the two-dimensional filter 200 is referred to as a filter signal S200 (obliquely reduced signal). Characteristics of the two-dimensional filter 200 will be described later.

The sharpening unit 150 includes two sharpening process sections 100 which are cascade-connected with each other. As described above, the sharpening process section 100 carries out nonlinear operation with respect to a high frequency component included in the input signal Sin so as to output a harmonic of the input signal Sin.

One of the two sharpening process sections 100 carries out the sharpening process with respect to a horizontal direction of an image indicated by an input signal. This sharpening process section 100 is referred to as a sharpening process section 100A (horizontal sharpening means, horizontal sharpening circuit). A harmonic outputted from the sharpening process section 100A is referred to as a sharpened signal S101 (horizontal sharpened signal).

The other of the two sharpening process sections 100 carries out the sharpening process with respect to a vertical direction of the image indicated by the input signal. This sharpening process section 100 is referred to as a sharpening process section 100B (vertical sharpening means, vertical sharpening circuit). A harmonic outputted from the sharpening process section 100B is referred to as a sharpened signal S102 (vertical sharpened signal).

As illustrated in FIG. 1, the sharpening process section 100A is provided at an upper stage of cascade connection, and the sharpening process section 100B is provided at a lower stage of the cascade connection.

The filter signal S200 is inputted to the sharpening process section 100A, and a sharpened signal S101 outputted from the sharpening process section 100A is inputted to the sharpening process section 100B. A sharpening process signal S102 outputted from the sharpening process section 100B serves as an output signal SO.

(Modification Example)

The sharpening process section 100A may be provided at a stage earlier than that of the sharpening process section 100B, or vice versa. That is, instead of carrying out the sharpening process in a horizontal direction and then carrying out the sharpening process in a vertical direction, there may be carried out the sharpening process in the vertical direction and then the sharpening process in the horizontal direction.

Figure 2:
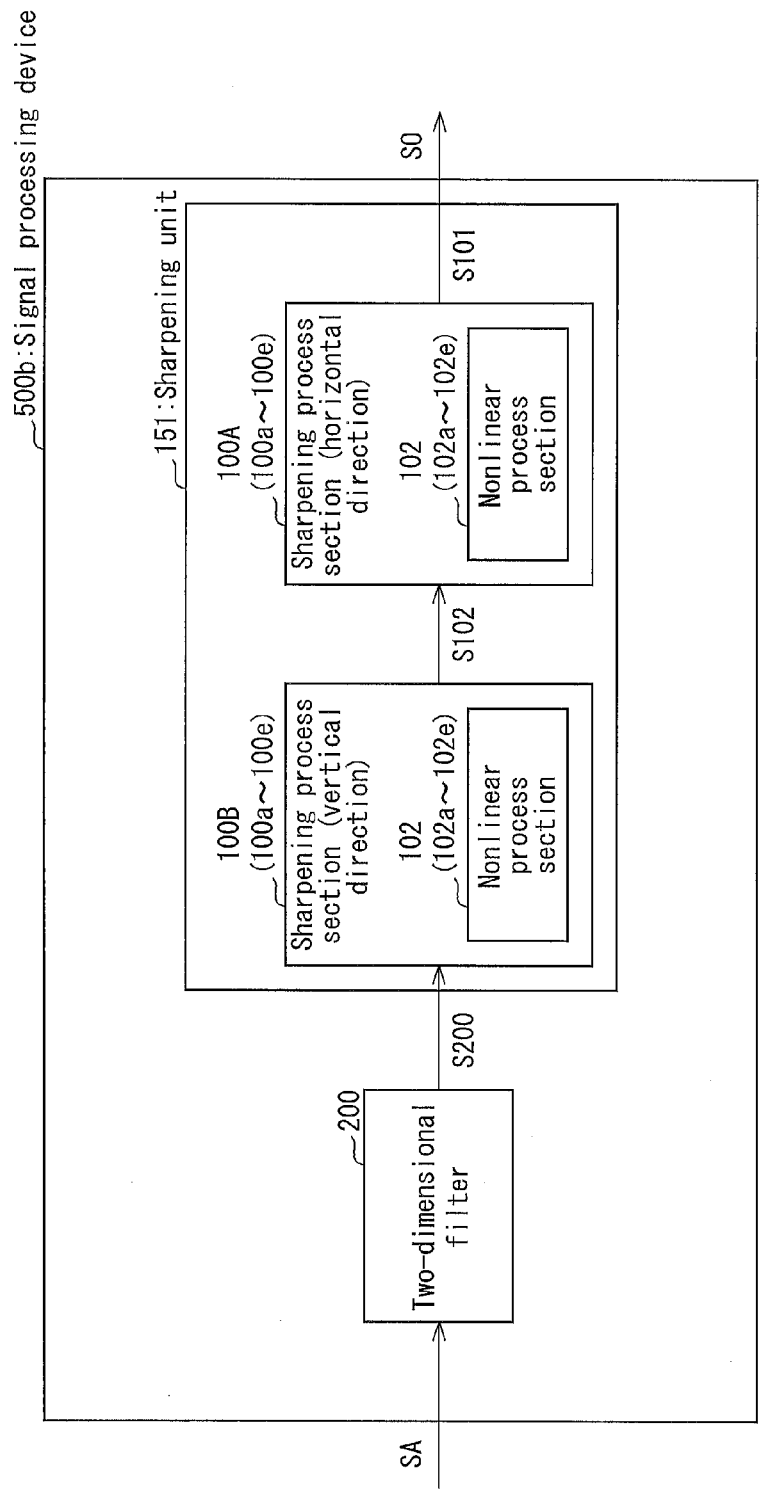
FIG. 2 is a block diagram illustrating a configuration of a modification example of the signal processing device illustrated in FIG. 1.

The signal processing device 500 in accordance with the present modification example is referred to as a signal processing device 500b. FIG. 2 shows a block diagram of a configuration of the signal processing device 500b.

As illustrated in FIG. 2, the signal processing device 500b includes a two-dimensional filter 200 and a sharpening unit (sharpening means, sharpening circuit) 151. The sharpening unit 151 includes a sharpening process section 100B at an upper stage and a sharpening process section 100A at a lower stage, which are cascade-connected with each other.

In this configuration, the filter signal S200 is inputted to the sharpening process section 100B, and a sharpened signal S102 outputted from the sharpening process section 100B is inputted to the sharpening process section 100A. A sharpening process signal S101 outputted from the sharpening process section 100A serves as an output signal SO.

Which of the signal processing device 500a and the signal processing device 500b is suitable is determined by frequency components included in an image to be sharpened. Specifically, as for an image in which a frequency component in a horizontal direction is higher than a frequency component in a vertical direction (e.g. an image of television broadcasting), the signal processing device 500a which carries out a sharpening process firstly in a horizontal direction is suitable. On the other hand, as for an image in which a frequency component in a vertical direction is higher than a frequency component in a horizontal direction, the signal processing device 500b which carries out a sharpening process firstly in a vertical direction is suitable.

(Characteristics of Two-Dimensional Filter Section)

A description will be provided below as to two-dimensional frequency characteristics of the two-dimensional filter 200. FIG. 3 shows a part of two-dimensional frequency characteristics of an image. The lateral axis indicates frequency in a horizontal direction, and the longitudinal axis indicates frequency in a vertical direction. Sampling frequency in the horizontal direction is indicated by fh, and sampling frequency in the vertical direction is indicated by fv.

The two-dimensional filter 200 (1) attenuates frequency components by at least 3 dB on line segments A-B, B-C, C-D, and D-A which join points indicative of Nyquist frequencies on the lateral and longitudinal axes in FIG. 3, (2) attenuates frequency components by at least 3 dB on regions P, Q, R, and S (meshed portions), and (3) blocks frequency components at points T, U, V, and W. The two-dimensional filter 200 may be any filter that has these characteristics.

Figure 4:
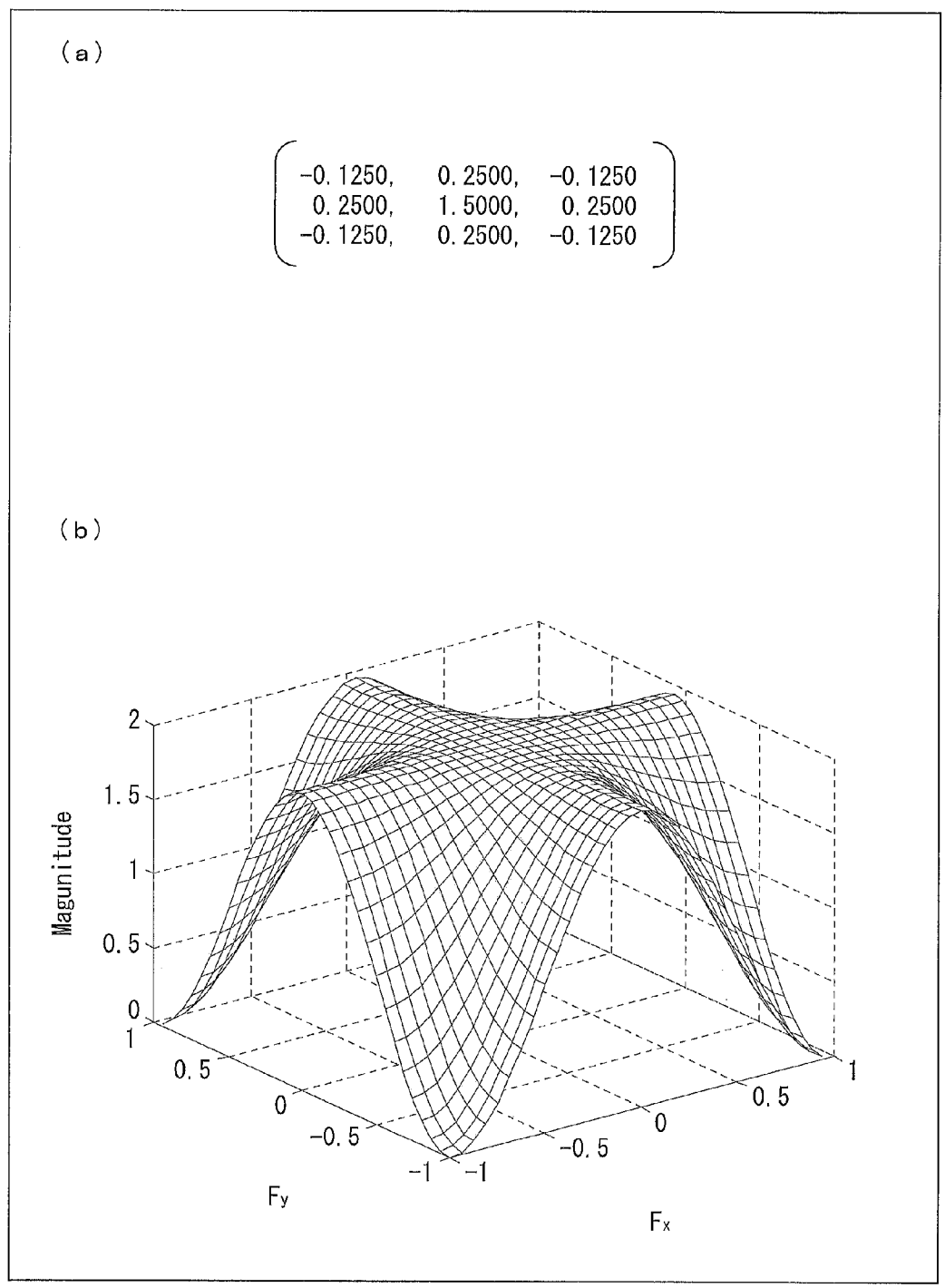
FIG. 4 is a schematic view illustrating a design example of a two-dimensional filter. (a) of FIG. 4 is an explanatory view showing tap coefficients of the two-dimensional filter. (b) of FIG. 4 is a schematic view showing transmission characteristics of the two-dimensional filter.
Figure 5:
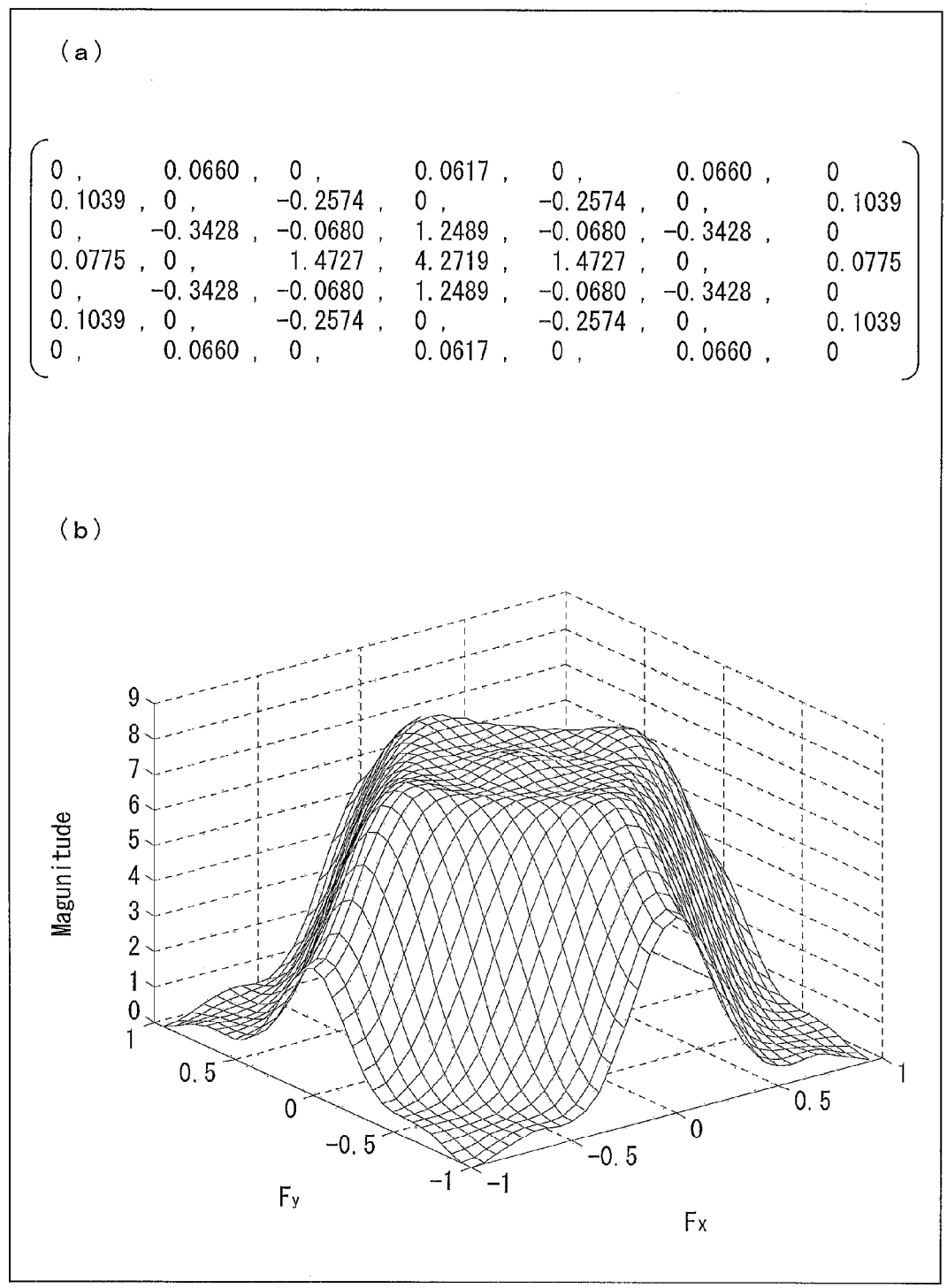
FIG. 5 is a schematic view illustrating another design example of a two-dimensional filter. (a) of FIG. 5 is an explanatory view showing tap coefficients of the two-dimensional filter. (b) of FIG. 5 is a schematic view showing transmission characteristics of the two-dimensional filter.

A description will be provided below as to a design example of the two-dimensional filter 200 that has the above characteristics with reference to FIGS. 4 and 5. FIGS. 4 and 5 are schematic views each illustrating a design example of the two-dimensional filter 200.

A description will be provided below as to a case of the two-dimensional filter 200 made of a two-dimensional low-pass filter constituted by three taps in each of horizontal and vertical directions. In this case, when tap coefficients are set to values illustrated in (a) of FIG. 4, transmission characteristics of the two-dimensional filter 200 are those illustrated in (b) of FIG. 4. As is seen from (b) of FIG. 4, the two-dimensional filter 200 configured as above can highly attenuate high frequency components in oblique directions.

A description will be provided below as to a case of the two-dimensional filter 200 made of a two-dimensional low-pass filter constituted by seven taps in each of horizontal and vertical directions. In this case, when tap coefficients are set to values illustrated in (a) of FIG. 5, transmission characteristics of the two-dimensional filter 200 are those illustrated in (b) of FIG. 5. As is seen from (b) of FIG. 5, the two-dimensional filter 200 configured as above can further highly attenuate high frequency components in oblique directions.

The tap coefficients illustrated in (a) of FIG. 4 and (a) of FIG. 5 are merely examples and are not intended to limit the values of tap coefficients of the present invention.

(Configuration of Sharpening Process Section)

The following details the configuration of the sharpening process section 100.

(Configuration Example 1 of Sharpening Process Section)

FIG. 6 is a block diagram illustrating a configuration of a sharpening process section 100a. As illustrated in FIG. 6, the sharpening process section 100a includes a high-frequency component extracting section (horizontal low-frequency component removing means, vertical low-frequency component removing means, horizontal sub-low-frequency component removing means, vertical sub-low-frequency component removing means, horizontal low-frequency component removing circuit, vertical low-frequency component removing circuit) 11, a nonlinear process section 102a, and an addition section (horizontal addition means, vertical addition means, horizontal sub-addition means, vertical sub-addition means, horizontal addition circuit, vertical addition circuit) 15.

Figure 7:
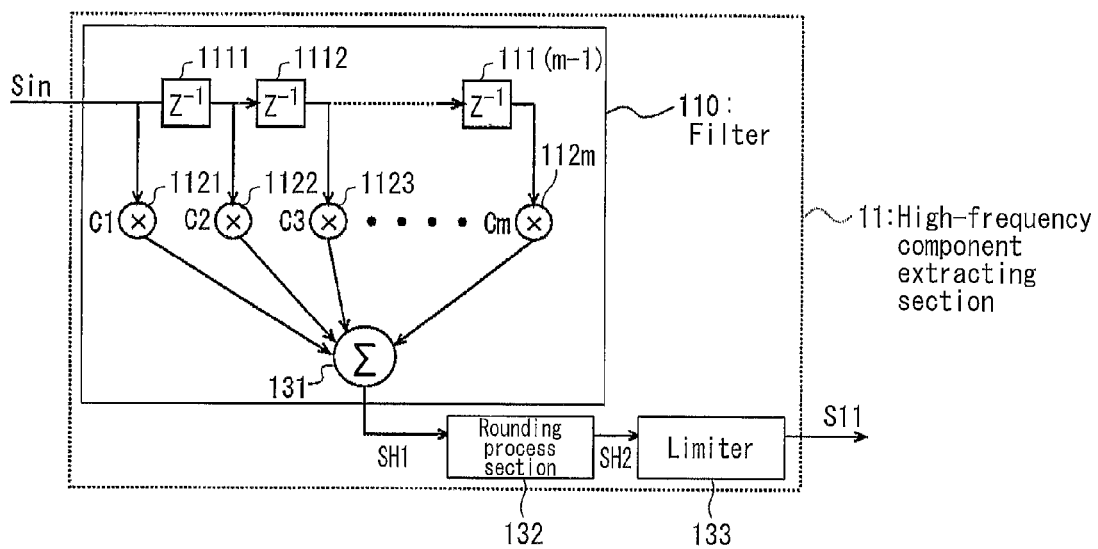
FIG. 7 is a block diagram illustrating a configuration of a high-frequency component extracting section included in the sharpening process section illustrated in FIG. 6.

First, an explanation is made as to the high-frequency component extracting section 11. Schematically, the high-frequency component extracting section 11 extracts a high frequency component in the input signal Sin and outputs the component as a high-frequency signal S11 (horizontal low-frequency-free signal, vertical low-frequency-free signal, horizontal sub-low-frequency-free signal, vertical sub-low-frequency-free signal). With reference to FIG. 7, an explanation is made as to a configuration of the high-frequency component extracting section 11. FIG. 7 is a block diagram illustrating the configuration of the high-frequency component extracting section 11.

As illustrated in FIG. 7, the high-frequency component extracting section 11 includes a filter 110, a rounding process section (low-level signal removing means) 132, and a limiter (high-level signal removing means) 133.

The filter 110 is an m-tap transversal high-pass filter including m−1 unit delay elements 111$h$ (h=1, 2, . . . , m−1: m is a positive integer of 3 or greater), m multiplication sections 112$k$ (k=1, 2, . . . , m), and an addition section 131. The filter 110 receives the input signal Sin as input and outputs a high band signal SH1.

Each of the unit delay elements 111$h$ delays an input signal by unit time and outputs the delayed signal. The unit delay element 1111 (h=1) receives the input signal Sin.

In the sharpening process section 100A, each of the unit delay elements 111$h$ outputs a signal delayed by unit time in a horizontal direction of an image indicated by an input signal (i.e. a signal indicative of a pixel group constituted by pixels adjacently aligned in a horizontal direction of the image indicated by the input signal). On the other hand, in the sharpening process section 100B, each of the unit delay elements 111$h$ outputs a signal delayed by unit time in a vertical direction of the image indicated by the input signal (i.e. a signal indicative of a pixel group constituted by pixels adjacently aligned in a vertical direction of the image indicated by the input signal).

Each of the multiplication sections 112$k$ multiplies the input signal by a coefficient Ck, and outputs the result of the multiplication to the addition section 131. The coefficient Ck is set beforehand so that the filter 110 serves as a high-pass filter. For example, in a case where m=3, by setting C1, C2, and C3 to 0.5, −1, and 0.5, respectively, the filter 110 serves as a high-pass filter.

The addition section 131 adds signals from the addition sections 112$k$ so as to generate the high band signal SH1.

Figure 8:
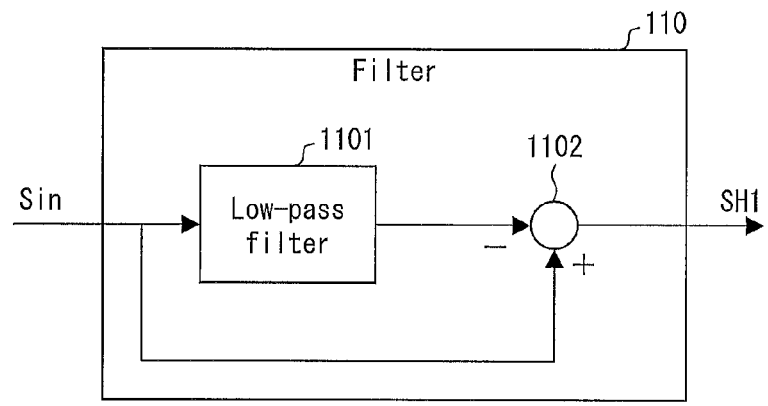
FIG. 8 is a block diagram illustrating another configuration example of a filter included in the high-frequency component extracting section illustrated in FIG. 7.

As is generally known, a low-pass filter is easier to fabricate than fabricating a high-pass filter. Therefore, the filter 110 may be constituted by a low-pass filter. FIG. 8 illustrates another configuration example of the filter 110. As illustrated in FIG. 8, the filter 110 may be constituted by a low-pass filter 1101 and a subtraction section 1102.

In order not to amplify noises in the nonlinear process section 102 provided subsequently, the rounding process section 132 removes a low level signal which can be regarded as a noise in the high band signal SH1, thereby generating a low-level-free signal SH2.

Specifically, out of signal values of the high band signal SH1, the rounding process section 132 changes a signal value whose absolute value is not more than a predetermined lower limit LV to "0", thereby generating the low-level-free signal SH2.

For example, in a case where the input signal Sin can be any integer ranging from −255 to 255, when the lower limit LV is "2", the rounding process section 132 regards, as noises, all signal values whose absolute value is not more than "2" out of signal values of the high band signal SH1, and changes such signal values to "0" (i.e. rounds such signal values).

Subsequently, in order that a signal already having a sufficiently high energy is not further amplified in the nonlinear process section 102 provided subsequently, the limiter 133 removes a high-level signal value in the low-level-free signal SH2, thereby generating a high-frequency signal S11.

Specifically, in order that a signal value of the low-level-free signal SH2 is not more than a predetermined upper limit UV1, with respect to signal values of the low-level-free signal SH2, the limiter 133 carries out a process of changing signal values whose absolute values are more than the upper limit UV1 so that their absolute values are not more than the upper limit UV1 (hereinafter also referred to as a clip process), thereby generating the high-frequency signal S11.

For example, out of signal values of the low-level-free signal SH2, signal values whose absolute values are more than "64" are changed to "64" or "−64" according to signs. Alternatively, the signal values may be changed to "0".

In a case where the input signal Sin is an 8-bit signal, the filter 110 adds, to the input signal Sin, a signal limited to be not more than 3rdMSB (approximately 64 or −64 in 8-bit signal) based on 12-bit calculation. Accordingly, the rounding process section 132 and the limiter 133 carry out a process of limiting the result of calculation by the filter 110 to 8-bit signals.

In the above explanation, the high-frequency component extracting section 11 includes the rounding process section 132 and the limiter 133. Alternatively, the high-frequency component extracting section 11 may include a member obtained by integrating the rounding process section 132 and the limiter 133 with each other.

Next, the nonlinear process section 102$a$ is to be described. As illustrated in FIG. 6, the nonlinear process section 102$a$ includes a nonlinear operation section (even exponentiation operation means, square root operation means) 21, a sign changing section (sign changing means) 41, and a limiter (horizontal amplitude adjustment means, vertical amplitude adjustment means, horizontal sub-amplitude adjustment means, vertical sub-amplitude adjustment means) 51.

The nonlinear operation section 21 carries out a nonlinear operation to the high-frequency signal S11, so as to generate a nonlinear signal S21.

The nonlinear operation which is carried out by the nonlinear operation section 21 is described here. The following description denotes a signal value to be supplied to the nonlinear operation section 21 as x, denotes a signal value to be supplied from the nonlinear operation section 21 as y, and expresses the nonlinear operation which is carried out by the nonlinear operation section 21 as a function y=f(x).

Assume here that the function f(x) is a nonlinear monotone increasing function which monotonically increases so as to be in positive and negative symmetry (origin symmetry). Note that "monotone increasing" means broad monotone increasing. However, it is only necessary that the function f(x) monotonically increase at least in the vicinity of x="0". It is preferable that the function f(x) be |f(x)|>|x| at least in the vicinity of x="0".

Such a function f(x) is exemplified by those expressed as the following expressions (1) through (3). Note that it is preferable that the functions f(x) expressed as the expressions (2) and (3) be used in an interval 0≤x≤1 since the functions f(x) greatly increase in the interval.

$$f(x) = x^{2n} \text{ ($n$ is a natural number)} \qquad (1)$$

$$f(x) = |x|^{1/2} \qquad (2)$$

$$f(x)=|x|^{1/10} \quad (3)$$

In a case where the expression (1) is used as the function f(x), the nonlinear operation section 21 raises the high-frequency signal S11 to an even exponent not less than 2, so as to generate the nonlinear signal S21 (even exponentiation signal, square root signal). For example, in a case where n=1 (i.e., f(x)=$x^2$) in the expression (1), the nonlinear operation section 21 squares the high-frequency signal S11, to generate the nonlinear signal S21. Assuming in this case that data sequences constituting the high-frequency signal S11 are X1, X2, X3, . . . , the nonlinear signal S21 obtained by squaring the high-frequency signal S11 becomes a digital signal constituted by data sequences $X1^2$, $X2^2$, and $X3^2$, . . . .

In a case where a signal value of the high-frequency signal S11 is any of integer values −255 through 255, 255 may be used to normalize x, in using the function f(x). For example, the expression (2) may be replaced with the following expression (4) obtained by using x/255 to normalize x on the right side of the function f(x) expressed as the expression (2) and multiplying the right side by 255. Note that the expression (4) meets the requirement of f(x)>x.

$$f(x)=255|x/255|^{1/2} \quad (4)$$

In the expression (4), 255 is used to normalize x on the right side of the function f(x) expressed as the expression (2) and the right side is multiplied by 255. However, a numerical value by which the right side is multiplied does not need to be identical to a value (255 in this example) to normalize x. It is only necessary that the numerical value meet the requirement of |f(x)|>|x|. For example, the following expression (5) in which the right side is multiplied by 100 instead of 255 may be replaced with the expression (4).

$$f(x)=100|x/255|^{1/2} \quad (5)$$

Further, the function f(x) may be expressed as the following expression (6), which uses a trigonometric function.

$$f(x)=255|\sin[(x/255)(\pi/2)]| \quad (6)$$

Subsequently, in accordance with sign bit information on the high-frequency signal S11, the sign changing section 41 generates, as a sign change signal S41, a signal obtained by reflecting a sign of the high-frequency signal S11 in the nonlinear signal S21. Namely, the sign changing section 41 retains a sign of a part of the nonlinear signal S21 which part is identical in sign to the high-frequency signal S11. In contrast, the sign changing section 41 reverses positive and negative signs of a part of the nonlinear signal S21 which part is different in sign from the high-frequency signal S11.

Then, the limiter 51 carries out a process (hereinafter also described as an amplitude adjustment process) for adjusting amplitude (signal level, intensity) of the sign change signal S41 which is generated by the sign changing section 41, to generate a nonlinear process signal (horizontal nonlinear process signal, vertical nonlinear process signal, horizontal sub-nonlinear process signal, vertical sub-nonlinear process signal) S12. Specifically, the limiter 51 multiplies the sign change signal S41 by a specific magnification value α(|α|<1) (first to fourth predetermined magnification values), so as to adjust the amplitude of the sign change signal S41.

It is desirable that the magnification value α is appropriately set according to motion of an image and an amount of noises. In a case where the magnification value α is a fixed value, it is desirable that the absolute value of the magnification value α is 0.5 or less for example.

In order not to further amplify a signal which has sufficient energy, the limiter 51 carries out a process (hereinafter also described as a clip process) for changing, to a value not more than a predetermined upper limit UV2, an absolute value of a part of the nonlinear process signal S12 which part has an absolute value higher than the upper limit UV2, so that a signal value of the nonlinear process signal S12 is not more than the upper limit UV2. For example, in a case where a part of the nonlinear process signal S12 has a signal value whose absolute value exceeds "64", the limiter 51 changes the signal value to "64" or "−64" in accordance with a sign of the part of the signal value. Alternatively, the limiter 51 may change the part of the signal value to "0".

Note that the nonlinear process section 102*a* may include no limiter 51 that carries out the amplitude adjustment process and the clip process on the sign change signal S41. In this case, the nonlinear process section 102*a* outputs, as the nonlinear process signal S12, the sign change signal S41 which is generated by the sign changing section 41.

Finally, the addition section 15 is to be described. The addition section 15 adds the nonlinear process signal S12 as a correction signal to the input signal Sin, so as to generate the output signal Sout. Note that the addition section 15 appropriately includes a delay element for adjusting timing between the input signal Sin and the nonlinear process signal S12.

(Waveform of Signal in Configuration Example 1)

The following description discusses waveforms of signals generated by sections of the sharpening process section 100*a* with reference to (a) through (e) of FIG. 9. (a) through (e) of FIG. 9 schematically illustrate waveforms of the signals generated by the sections of the sharpening process section 100*a*. It is assumed here that the sharpening process section 100*a* receives the signal illustrated in (a) of FIG. 9 as the input signal Sin.

Initially, when the input signal Sin is inputted to the high-frequency component extracting section 11, a high-frequency component included in the input signal Sin is extracted so that the high-frequency signal S11 illustrated in (b) of FIG. 9 is generated.

Next, in a case where the nonlinear operation carried out by the nonlinear operation section 21 of the nonlinear process section 102*a* is f(x)=$x^2$, the nonlinear operation section 21 generates the nonlinear signal S21 obtained by squaring the high-frequency signal S11 (see (c) of FIG. 9).

Subsequently, the sign changing section 41 which has received the nonlinear signal S21 generates the sign change signal S41 (see (d) of FIG. 9). As illustrated in (d) of FIG. 9, the sign change signal S41 retains positive and negative signs of the high-frequency signal S11 illustrated in (b) of FIG. 9.

Then, the limiter 51 which has received the sign change signal S41 carries out the amplitude adjustment process and the clip process, so as to generate the nonlinear process signal S12. Thereafter, the addition section 15 adds the nonlinear process signal S12 to the input signal Sin, so as to generate the output signal Sout (see (e) of FIG. 9).

Note that rising and falling of the signal of the nonlinear process signal S12 (see (e) of FIG. 9), which are steeper than those of a signal obtained by enhancing the input signal Sin by use of the linear operation, are to be described with reference to FIG. 10.

The signal illustrated in (a) of FIG. 10 is identical to the input signal Sin illustrated in (a) of FIG. 9. In order to enhance the input signal Sin illustrated in (a) of FIG. 10, a sharpening process using the linear operation uses a method in which a high-frequency signal is extracted from the input signal Sin illustrated in (a) of FIG. 10 and the input signal Sin is added to the high-frequency signal thus extracted. Therefore, a signal component which is not contained in the input signal Sin and exceeds the Nyquist frequency is not added in the sharpening process using the linear operation.

Consequently, in the sharpening process using the linear operation, a signal illustrated in (b) of FIG. 10 is generated. Rising of the signal illustrated in (b) of FIG. 10 is sharper than rising of the input signal Sin illustrated in (a) of FIG. 10. However, rising of the non-liner process signal S12 ((e) of FIG. 9) generated by the sharpening process section 100a is further steeper.

(Configuration Example 2 of Sharpening Process Section)

The nonlinear process section 102a described above may differentiate the nonlinear signal S21 which is generated by the nonlinear operation section 21. This is because differentiation of the nonlinear signal S21 allows removal of a direct-current component contained in the nonlinear operation section 21.

Therefore, a configuration example of the sharpening process section 100b is to be described with reference to FIG. 11. FIG. 11 is a block diagram illustrating a configuration of the sharpening process section 100b.

As illustrated in FIG. 11, the sharpening process section 100b includes a high-frequency component extracting section 11, a nonlinear process section 102b, and an addition section 15. The nonlinear process section 102b includes not only the configuration of the nonlinear process section 102a illustrated in FIG. 6 but also a differentiation section (differentiation means) 31 between the nonlinear operation section 21 and the sign changing section 41. The high-frequency component extracting section 11, members other than the differentiation section 31 in the nonlinear process section 102b, and the addition section 15 are the same as those explained above and therefore detailed explanations thereof are omitted here.

The differentiation section 31 differentiates the nonlinear signal S21 generated by the nonlinear operation section 21, thereby generating a differential signal S31.

A configuration of the differentiation section 31 is to be described with reference to FIG. 12. FIG. 12 is a block diagram illustrating a configuration of the differentiation section 31. As illustrated in FIG. 12, the differentiation section 31 includes a unit delay element 3111 and a subtraction section 3112. The differentiation section 31 finds a backward difference with respect to a signal supplied to the differentiation section 31.

With respect to the differential signal S31 which has been generated by the differentiation section 31, in accordance with sign bit information on the high-frequency signal S11, the sign changing section 41 generates, as a sign change signal S42, a signal obtained by reflecting a sign of the high-frequency signal S11 in the nonlinear signal S21. Namely, the sign changing section 41 retains a sign of a part of the differential signal S31 which part is identical in sign to the high-frequency signal S11. In contrast, the sign changing section 41 reverses positive and negative signs of a part of the nonlinear signal S21 which part is different in sign from the high-frequency signal S11.

The limiter 51 carries out the amplitude adjustment process and the clip process with respect to the sign change signal S42 which is generated by the sign changing section 41, so as to generate the nonlinear process signal S12. According to the amplitude adjustment process, the sign change signal S42 is multiplied by a predetermined magnification value α, to adjust amplitude of the sign change signal S42.

Note that the nonlinear process section 102b may include no limiter 51 and not carry out the amplitude adjustment process and the clip process with respect to the sign change signal S42. In this case, the nonlinear process section 102b outputs, as the nonlinear process signal S12, the sign change signal S42 which is generated by the sign changing section 41.

(Waveform of signal in Configuration Example 2)

The following explains waveforms of signals generated by sections of the sharpening process section 100b with reference to (a) through (f) of FIG. 13. (a) through (f) of FIG. 13 schematically illustrate waveforms of signals generated by sections of the sharpening process section 100b. Here, it is assumed that a signal illustrated in (a) of FIG. 13 is inputted as the input signal Sin to the sharpening process section 100b. The signal illustrated in (a) of FIG. 13 is the same as the signal illustrated in (a) of FIG. 9.

Initially, when the input signal Sin is inputted to the high-frequency component extracting section 11, a high-frequency component included in the input signal Sin is extracted so that the high-frequency signal S11 illustrated in (b) of FIG. 13 is generated.

Subsequently, when nonlinear operation carried out by the nonlinear operation section 21 of the nonlinear process section 102b is based on $f(x)=x^2$, the nonlinear signal S21 obtained by squaring the high-frequency signal S11 is generated by the nonlinear operation section 21 (see (c) of FIG. 13).

Subsequently, when the nonlinear signal S21 is inputted to the differentiation section 31, the differential signal S31 illustrated in (d) of FIG. 13 is generated. It should be noted that the differential signal S31 does not include a direct current component which has been included in the nonlinear signal S21.

Subsequently, when the differential signal S31 is inputted into the sign changing section 41, the sign change signal S42 illustrated in (e) of FIG. 13 is generated. As illustrated in (e) of FIG. 13, the sign change signal S42 has the same positive and negative signs as those of the high-frequency signal S11 illustrated in (b) of FIG. 13.

Subsequently, when the sign change signal S41 is inputted to the limiter 51, the amplitude adjustment process and the clip process are carried out, to generate the nonlinear process signal S12. Lastly, the addition section 15 adds the nonlinear process signal S12 to the input signal Sin, thereby generating the output signal Sout (see (f) of FIG. 13).

Rising and falling of the output signal Sout illustrated in (f) of FIG. 13 are steeper than those of a signal sharpened based on linear operation.

(Configuration Example 3 of Sharpening Process Section)

The nonlinear process section 102a and the nonlinear process section 102b explained above include the sign changing section 41. Alternatively, the nonlinear process section of the present invention may be arranged not to include the sign changing section 41 as long as the nonlinear operation carried out on the high-frequency signal S11 retains the positive and negative signs of the high-frequency signal S11.

With reference to FIG. 14, the following explains a configuration example of a sharpening process section 100c which does not include the sign changing section 41. FIG. 14 is a block diagram illustrating a configuration of the sharpening process section 100c.

As illustrated in FIG. 14, the sharpening process section 100c includes a high-frequency component extracting section 11, a nonlinear process section 102c, and an addition section 15. The nonlinear process section 102c includes a nonlinear operation section (odd exponentiation operation means) 22 and a limiter 51. The high-frequency component extracting section 11, the limiter 51, and the addition section 15 are the same as those explained above and detailed explanations thereof are omitted here.

The nonlinear operation section 22 carries out nonlinear operation on the high-frequency signal S11, thereby generating a nonlinear signal S22.

The nonlinear operation which is carried out by the nonlinear operation section 22 is described here. The following description denotes a signal value to be supplied to the nonlinear operation section 22 as x, denotes a signal value to be supplied from the nonlinear operation section 22 as y, and expresses the nonlinear operation which is carried out by the nonlinear operation section 22 as a function y=g(x).

Assume here that the function g(x) is a nonlinear monotone increasing function which monotonically increases so as to be in positive and negative symmetry (origin symmetry). Note that "monotone increasing" means broad monotone increasing. However, it is only necessary that the function g(x) monotonically increases at least in the vicinity of x="0". It is preferable that the function g(x) be |g(x)|>|x| at least in the vicinity of x="0".

Such a function g(x) is exemplified by that expressed as the following expression (7).

$$g(x)=x^{3n} \text{ (}n\text{ is a natural number)} \quad (7)$$

In a case where the expression (7) is used as the function g(x), the nonlinear operation section 22 raises the high-frequency signal S11 to an odd exponent not less than 3, so as to generate the nonlinear signal S22. For example, in a case where n=1 (i.e., $g(x)=x^3$) in the expression (7), the nonlinear operation section 22 cubes the high-frequency signal S11, so as to generate the nonlinear signal S22. Assuming in this case that data sequences constituting the high-frequency signal S11 are X1, X2, X3, . . . , the nonlinear signal S22 obtained by cubing the high-frequency signal S11 becomes a digital signal constituted by data sequences $X1^3$, $X2^3$, and $X3^3$, . . . .

The limiter 51 carries out the amplitude adjustment process and the clip process with respect to the nonlinear signal S22 generated by the nonlinear operation section 22, so as to generate the nonlinear process signal S12.

Note that the nonlinear process section 102c may include no limiter 51 that carries out the amplitude adjustment process and the clip process with respect to the nonlinear signal S22. In this case, the nonlinear process section 102c outputs, as the nonlinear process signal S12, the nonlinear signal S22 which is generated by the nonlinear operation section 22.

(Waveform of Signal in Configuration Example 3)

The following explains waveforms of signals generated by sections of the sharpening process section 100c with reference to (a) through (d) of FIG. 15. (a) through (d) of FIG. 15 schematically illustrate waveforms of the signals generated by sections of the sharpening process section 100c. Here, it is assumed that a signal illustrated in (a) of FIG. 15 is inputted to the sharpening process section 100c as the input signal Sin. The signal illustrated in (a) of FIG. 15 is the same as the signal illustrated in (a) of FIG. 9.

Initially, when the input signal Sin is inputted to the high-frequency component extracting section 11, a high-frequency component included in the input signal Sin is extracted so that the high-frequency signal S11 illustrated in (b) of FIG. 15 is generated.

Subsequently, when nonlinear operation carried out by the nonlinear operation section 22 is $f(x)=x^3$, the nonlinear signal S22 obtained by raising the high-frequency signal S11 to the power of three is generated by the nonlinear operation section 22 (see (c) of FIG. 15).

Subsequently, when the nonlinear signal S22 is inputted to the limiter 51, the amplitude adjustment process and the clip process are carried out, to generate the nonlinear process signal S12. Lastly, the addition section 15 adds the nonlinear process signal S12 to the input signal Sin, thereby generating the output signal Sout (see (d) of FIG. 15).

Rising and falling of the output signal Sout illustrated in (d) of FIG. 15 are steeper than those of a signal sharpened based on linear operation.

(Reason why Frequency Higher than Nyquist Frequency is Generated)

The following explains why the output signal Sout generated by the sharpening process section 100 includes a high-frequency component higher than Nyquist frequency fs/2, such as a harmonic component included in the input signal Sin.

Here, it is assumed that the input signal Sin is represented by a function F(x) where x represents time. When a base angular frequency of the input signal Sin is ω, the function F(x) can be represented by formula (8) below which is a Fourier series.

$$F(x) = a_{-N}\cos(-N)\omega x + a_{-N+1}\cos(-N+1)\omega x + \quad (8)$$
$$\ldots + a_{-1}\cos(-1)\omega x + a_0 + a_1\cos\omega x + a_2\cos 2\omega x + \ldots +$$
$$a_N\cos N\omega x + b_{-N}\sin(-N)\omega x + b_{-N+1}\sin(-N+1)\omega x + \ldots +$$
$$b_{-1}\sin(-1)\omega x + b_1\sin\omega x + b_2\sin 2\omega x + \ldots + b_N\sin N\omega x$$

In the expression (8), N is a degree of a higher harmonic wave having a maximum frequency which does not exceed the Nyquist frequency fs/2 with respect to the sampling frequency fs. Namely, the following expression (9) is met.

$$N\omega/(2\pi) < fs/2 \leq (N+1)\omega/(2\pi) \quad (9)$$

Next, in a case where a signal of the input signal Sin expressed as the function F(x) other than a direct-current component $a_0$ is denoted as G(x), G(x) is expressed as the following expression (10).

$$G(x) = a_{-N}\cos(-N)\omega x + a_{-N+1}\cos(-N+1)\omega x + \quad (10)$$
$$\ldots + a_{-1}\cos(-1)\omega x + a_1\cos\omega x + a_2\cos 2\omega x + \ldots +$$
$$a_N\cos N\omega x + b_{-N}\sin(-N)\omega x + b_{-N+1}\sin(-N+1)\omega x + \ldots +$$
$$b_{-1}\sin(-1)\omega x + b_1\sin\omega x + b_2\sin 2\omega x + \ldots + b_N\sin N\omega x$$

Here, the input signal Sin inputted into the sharpening process section 100 includes a signal G(x) or a high-frequency component of the signal G(x).

For example, in a case where the nonlinear operation section 21 carries out the nonlinear operation of $f(x)=x^2$, the nonlinear operation section 21 generates the nonlinear signal S21 by squaring the high-frequency signal S11. Note here that each term of $(G(x))^2$ is expressed as any of the following expressions (11) through (13) based on the expression (10) (i=±1, ±2, . . . , ±N; j=±1, ±2, . . . , ±N).

$$a_i \cos i\omega x \cdot a_j \cos j\omega x \quad (11)$$

$$a_i \cos i\omega x \cdot b_j \sin j\omega x \quad (12)$$

$$b_i \sin i\omega x \cdot b_j \sin j\omega x \quad (13)$$

Note here that the expressions (11) through (13) can be rewritten to the following respective expressions (14) through (16) by use of trigonometric formulae.

$$(a_i a_j/2)\{\cos(i+j)\omega x + \cos(i-j)\omega x\} \quad (14)$$

$$(a_i b_j/2)\{\sin(i+j)\omega x - \sin(i-j)\omega x\} \quad (15)$$

$$(-b_i b_j/2)\{\cos(i+j)\omega x - \cos(i-j)\omega x\} \quad (16)$$

$(G(x))^2$ contains angular frequency components such as $(N+1)\omega, (N+2)\omega, \ldots,$ and $2N\omega$ (see expressions (14) through (16) above).

Accordingly, $(G(x))^2$ contains a frequency component which is higher than the Nyquist frequency fs/2. Namely, the nonlinear signal S21 which is generated by the nonlinear operation section 21 contains a frequency component which is higher than the Nyquist frequency fs/2 such as a harmonic component having a frequency of $2N\omega/(2\pi)$.

Similarly, for example, in a case where the nonlinear operation section 22 carries out the nonlinear operation of $f(x)=x^3$, the nonlinear operation section 22 generates the nonlinear signal S22 by cubing the high-frequency signal S11. Note here that each term of $(G(x))^3$ is expressed as any of the following expressions (17) through (20) based on the expression (10) ($i=\pm 1, \pm 2, \pm N; j=\pm 1, \pm 2, \pm N; k=\pm 1, \pm 2, \ldots, \pm N$).

$$a_i \cos i\omega x \cdot a_j \cos j\omega x \cdot a_k \cos k\omega x \quad (17)$$

$$a_i \cos i\omega x \cdot a_j \cos j\omega x \cdot b_k \sin k\omega x \quad (18)$$

$$a_i \cos i\omega x \cdot b_j \sin j\omega x \cdot b_k \sin k\omega x \quad (19)$$

$$b_i \sin i\omega x \cdot b_j \sin j\omega x \cdot b_k \sin k\omega x \quad (20)$$

Note here that, in a case where attention is paid to terms in which $i=j=k=N$ and which are expressed as the expressions (17) and (20), these terms can be rewritten in the following respective expressions (21) and (22) by use of trigonometric formulae.

$$(a_N \cos N\omega x)^3 = a_N^3 \{(3/4)\cos N\omega x + (1/4)\cos 3N\omega x\} \quad (21)$$

$$(b_N \sin N\omega x)^3 = b_N^3 \{(3/4)\sin N\omega x - (1/4)\sin 3N\omega x\} \quad (22)$$

Moreover, for example, in a case where attention is paid to terms in which $i=j=k=-N$ and which are expressed as the expressions (17) and (20), these terms can be rewritten in the following respective expressions (23) and (24) by use of trigonometric formulae.

$$\{a_N \cos(-N\omega x)\}^3 = a_N^3 \{(3/4)\cos(-N\omega x)+(1/4)\cos(-3N\omega x)\} \quad (23)$$

$$\{b_N \sin(-N\omega x)\}^3 = b_N^3 \{(3/4)\sin(-N\omega x)-(1/4)\sin(-3N\omega x)\} \quad (24)$$

$(G(x))^3$ contains a frequency component which is 3N times a base angular frequency $\omega$ and a frequency component which is $-3N$ times the base angular frequency $\omega$ (see the expressions (21) through (24)). The expressions (21) through (24) show that, in a case where the other terms of $(G(x))^3$ are rewritten by use of trigonometric formulae, $(G(x))^3$ contains various frequency components which range from 3N times to $-3N$ times the base angular frequency $\omega$.

Accordingly, $(G(x))^3$ contains a frequency component which is higher than the Nyquist frequency fs/2. Namely, the nonlinear signal S22 which is generated by the nonlinear operation section 22 contains a frequency component which is higher than the Nyquist frequency fs/2 such as a harmonic component having a frequency of $3N\omega/(2\pi)$.

As described above, the output signal Sout generated by the sharpening process section 100 includes a high frequency component which is not included in the input signal Sin, i.e. a frequency component whose frequencies are higher than the Nyquist frequency.

(Another Configuration Example 1 of Sharpening Process Section)

There are many kinds of nonlinear operations carried out by the sharpening process section 100 other than those explained above. With reference to FIGS. 16 and 17, the following explains configuration examples of a sharpening process section 100d and a sharpening process section 100e.

Initially, FIG. 16 is a block diagram illustrating a configuration of the sharpening process section 100d. As illustrated in FIG. 16, the sharpening process section 100d includes a high-frequency component extracting section 11, a nonlinear process section 102d, and an addition section 15. The high-frequency component extracting section 11 and the addition section 15 are the same as those explained above and thus detailed explanations thereof are omitted here.

The nonlinear process section 102d includes a square operation section 61, a first differentiation section 71, a second differentiation section 81, and a multiplication section 91.

The square operation section 61 squares the high-frequency signal S11, thereby generating a square signal S61. That is, when data sequences constituting the high-frequency signal S11 are X1, X2, X3, ..., the square signal S61 obtained by squaring the high-frequency signal S11 is a digital signal constituted by data sequences $X1^2, X2^2, X3^2, \ldots$.

Subsequently, the first differentiation section 71 differentiates the square signal S61 generated by the square operation section 61, thereby generating a first differential signal S71. The configuration of the first differentiation section 71 is the same as that of the differentiation section 31 for example.

Subsequently, the second differentiation section 81 differentiates the input signal Sin, thereby generating a second differential signal S81. The configuration of the second differentiation section 81 is the same as that of the differentiation section 31 for example.

Subsequently, the multiplication section 91 multiplies the first differential signal S71 by the second differential signal S81, thereby generating a nonlinear process signal S12. That is, when data sequences constituting the first differential signal S71 are U1, U2, U3, ... and data sequences constituting the second differential signal S81 are V1, V2, V3, ..., the nonlinear process signal S12 is a digital signal constituted by data sequences U1·V1, U2·V2, U3·V3, ....

In the configuration explained above, there is provided the square operation section 61 in order to carry out nonlinear operation. Alternatively, there may be used a fourth power operation section which raises the high-frequency signal S11 to the fourth power. More generally, there may be used an exponentiation operation section which generates a signal obtained by raising the high-frequency signal S11 to an even exponent not less than 2.

(Another Configuration Example 2 of Sharpening Process Section)

The sharpening process section 100d explained above includes the square operation section 61. Alternatively, the sharpening process section may include, instead of the square operation section 61, an absolute value process section 62 which calculates the absolute value of an input signal.

Accordingly, with reference to FIG. 17, the following explains a configuration example of a sharpening process section 100e including the absolute value process section 62. FIG. 17 is a block diagram illustrating a configuration of the sharpening process section 100e.

As illustrated in FIG. 17, the sharpening process section 100e includes a high-frequency component extracting section 11, a nonlinear process section 102e, and an addition section 15. The high-frequency component extracting section 11 and the addition section 15 are the same as those explained above, and so detailed explanations thereof are omitted here.

The nonlinear process section 102e includes the absolute value process section 62, a first differentiation section 71, a second differentiation section 81, and a multiplication section 91. The first differentiation section 71, the second differentiation section 81, and the multiplication section 91 are the same as those explained above, and so detailed explanations thereof are omitted here.

The absolute value process section 62 generates an absolute value signal S62 which is a signal whose values correspond to absolute values of the high-frequency signal S11. That is, when data sequences constituting the high-frequency signal S11 are X1, X2, X3, . . . , the absolute value signal S62 is a digital signal constituted by data sequences |X1|, |X2|, |X3|, . . . .

Subsequently, the first differentiation section 71 differentiates the absolute value signal S62 generated by the absolute value process section 62, thereby generating a first differential signal S72.

Subsequently, the multiplication section 91 multiplies the first differential signal S72 by the second differential signal S81, thereby generating a nonlinear process signal S12.

(Preferable Application Example of Signal Processing Device)

FIG. 19 shows a frequency spectrum of an image signal obtained by subjecting an image signal having a frequency spectrum illustrated in FIG. 18 to an enlarging process in which the image signal is upconverted so that the number of pixels in a lateral direction is doubled. As illustrated in FIG. 19, the image signal having been subjected to the enlarging process includes no frequency component between a Nyquist frequency fs/2 for a sampling frequency fs and a Nyquist frequency Fbs/2 (=fs) for a new sampling frequency Fbs. Consequently, when the image signal having been subjected to the enlarging process is subjected to a conventional sharpening process using linear operation, a frequency component in the vicinity of the Nyquist frequency Fbs/2 is not added.

In contrast, in the signal processing device 500, as described above, the image signal having been subjected to the sharpening process can contain a frequency component higher than the Nyquist frequency, so that an image signal obtained by the signal processing device 500 carrying out the sharpening process on the image signal having a frequency spectrum illustrated in FIG. 19 contains a frequency spectrum as illustrated in FIG. 20 for example. As illustrated in FIG. 20, a frequency component higher than the Nyquist frequency fs/2 is added to the frequency spectrum. That is, a high frequency component which is not included in the original signal is added.

As described above, the signal processing device 500 can add a high frequency component which cannot be used in the conventional sharpening process using linear operation, and consequently can appropriately sharpen an image indicated by the image signal having been subjected to the enlarging process.

Since frequency components in oblique directions of the image are reduced before the image is sharpened, a less amount of frequency components higher than the Nyquist frequency fs/2 are added in the oblique directions.

(How Image Looks after being Sharpened)

With reference to FIG. 21, the following description will discuss how an image looks after being subjected to the sharpening process in the image signal processing device 500a or the signal processing device 500b. FIG. 21 is a schematic view illustrating how an image is sharpened.

(a) of FIG. 21 is a view illustrating a longitudinal line, a lateral line, and an oblique line included in an image before being sharpened. As illustrated in (a) of FIG. 21, the image before being sharpened is a bit blurred.

(b) of FIG. 21 is a view illustrating a longitudinal line, a lateral line, and an oblique line obtained by subjecting the longitudinal line, the lateral line, and the oblique line illustrated in (a) of FIG. 21 to the sharpening process in the signal processing device 500a or the signal processing device 500b. It is found from (b) of FIG. 21 that sharpness and resolution of the image are higher after being sharpened than before being sharpened.

(c) of FIG. 21 is a view illustrating an oblique line of an image obtained by subjecting the oblique line of the image illustrated in (a) of FIG. 21 to the sharpening process in the sharpening process section 100A and the sharpening process section 100B without attenuating a high frequency component of the oblique line in the two-dimensional filter 200. In this case, as illustrated in (c) of FIG. 21, an edge portion of the oblique line is sharpened excessively and put in a fringed state.

As is seen from (b) of FIG. 21, the signal processing device 500a or the signal processing device 500b can more highly (strongly) sharpen an image in horizontal and vertical directions compared to the conventional art, while subduing a phenomenon in which an oblique line of the sharpened image looks glaring.

(Setting of Degree of Sharpening According to Two-Dimensional Filter)

It is preferable that the degree of sharpening by the sharpening process section 100A and the sharpening process section 100B is set according to the degree of attenuating frequency components in oblique directions of an image by the two-dimensional filter 200.

Specifically, in a case where the two-dimensional filter 200 does not greatly attenuate a frequency component in an oblique direction of an image, oblique lines of the image remain a bit. Therefore, in this case, in order to prevent the phenomenon in which the oblique lines of the sharpened image look glaring, it is preferable that the degree of sharpening by the sharpening process sections 100A and 100B in a subsequent stage is not so great. On the other hand, in a case where the two-dimensional filter 200 greatly attenuates a frequency component in an oblique direction of an image, oblique lines of the image are reduced. Therefore, in this case, even when the degree of sharpening by the sharpening process sections 100A and 100B in a subsequent stage is made higher, the oblique lines of the sharpened image do not look so glaring.

The degree of sharpening by the sharpening process sections 100A and 100B can be set according to one of two methods below.

One of the two methods is a method for setting a scale factor $\alpha$ to be multiplied by the sign change signal S41 by a limiter 51.

That is, as the amount of attenuating frequency components in oblique directions of an image by the two-dimensional filter 200 is larger, the scale factor $\alpha$ is set to be larger. By setting the scale factor $\alpha$ to be larger, amplitude of the sign change signal S41 becomes larger, resulting in larger amplitude of the nonlinear process signal S12. This makes the degree of sharpening higher.

On the other hand, as the amount of attenuating frequency components in oblique directions of an image by the two-dimensional filter 200 is smaller, the scale factor $\alpha$ is set to be smaller. By setting the scale factor $\alpha$ to be smaller, amplitude of the sign change signal S41 becomes smaller, resulting in smaller amplitude of the nonlinear process signal S12. This makes the degree of sharpening lower.

The other of the two methods is a method for setting a coefficient Ck of a filter 110 included in a high-frequency component extracting section 11 (changing frequency characteristics). In other words, this is a method using a filter 110 according to the degree of attenuating frequency components in oblique directions by the two-dimensional filter 200.

That is, the coefficient Ck of the filter 110 is set in such a manner that as the amount of attenuating frequency components in oblique directions of an image by the two-dimensional filter 200 is larger, a more amount of frequency components are passed by the filter 110. Setting the coefficient Ck as above increases a high band signal SH1, resulting in larger amplitude of the nonlinear process signal S12. This makes the degree of sharpening higher.

On the other hand, the coefficient Ck of the filter 110 is set in such a manner that as the amount of attenuating frequency components in oblique directions of an image by the two-dimensional filter 200 is smaller, a less amount of frequency components are passed by the filter 110. Setting the coefficient Ck as above decreases a high band signal SH1, resulting in smaller amplitude of the nonlinear process signal S12. This makes the degree of sharpening lower.

Second Embodiment

The signal processing device 500a or the signal processing device 500b explained in First Embodiment is designed such that oblique lines of the original image are reduced and then the original image is subjected to the sharpening process with respect to each of horizontal and vertical directions. Accordingly, in the sharpened image, the oblique lines remain reduced. Accordingly, by adding the oblique lines of the original image to the sharpened image, the sharpened image can have higher image quality.

In the present embodiment, a description will be provided below as to addition of the original image to the sharpened image. The following description will discuss an embodiment of the present invention with reference to FIGS. 22 and 23. The signal processing device 500 in accordance with the present embodiment is referred to as a signal processing device 500c. For convenience, members having the same functions as those in First Embodiment are given the same reference numerals and explanations thereof are omitted unless otherwise stated.

(Configuration of Signal Processing Device)

The following description will discuss a configuration of the signal processing device 500c with reference to FIG. 22. FIG. 22 is a block diagram illustrating the configuration of the signal processing device 500c. As illustrated in FIG. 22, the signal processing device 500c includes a high-pass filter (direct current component removing means) 220, a two-dimensional filter 200, a sharpening unit 150, and an addition section (input signal addition means) 240.

The high-pass filter 220 may be any generally known high-pass filter capable of removing a direct current component of the original image indicated by an input signal SA. The high-pass filter 220 may be a one-dimensional filter or a two-dimensional filter. A signal outputted from the high-pass filter 220 is referred to as a high band signal S220.

The two-dimensional filter 200 and the sharpening unit 150 are the same as those in First Embodiment except that the two-dimensional filter 200 attenuates high frequency components in oblique directions other than horizontal and vertical directions of an image indicated by the high band signal S220.

The addition section 240 generates an output signal SO by adding a sharpened signal S102 outputted from a sharpening process section 100B of the sharpening unit 150 and the input signal SA to each other. The addition section 240 includes, as appropriate, a delay element for adjusting timing between the sharpened signal S102 and the input signal SA.

The high-pass filter 220 is provided in order to prevent an increase in the direct current component when the sharpened signal S102 and the input signal SA are added to each other in the addition section 240. The high-pass filter 220 removes the direct current component from one of the signals to be added to each other.

Instead of attenuating high frequency components in oblique directions after removing the direct current component, there may be removed the direct current component after attenuation of high frequency components in oblique directions. That is, the high-pas filter 220 may be provided a stage later than that of the two-dimensional filter 200.

Instead of providing the high-pass filter 220 and the two-dimensional filter 200 separately, there may be provided one filter in which functions are integrated with each other.

(Modification Example)

In the present embodiment as well as in First Embodiment, the sharpening process section 100A may be provided at a stage earlier than that of the sharpening process section 100B, or vice versa. The signal processing device 500 in accordance with the present modification example is referred to as a signal processing device 500d. FIG. 23 is a block diagram illustrating a configuration of the signal processing device 500d.

As illustrated in FIG. 23, the signal processing device 500d includes a sharpening unit 151 instead of the sharpening unit 150 of the signal processing device 500c. A filter signal S200 is inputted to a sharpening process section 100B of the sharpening unit 151. A sharpened signal S102 outputted from the sharpening process section 100B is inputted to a sharpening process section 100A. A sharpened signal S101 outputted from the sharpening process section 100A of the sharpening unit 151 is inputted to the addition section 240.

(How Image Looks after being Sharpened)

As described above, the signal processing device 500c or the signal processing device 500d adds oblique lines of the original image to the sharpened image so as to emphasize oblique lines. Accordingly, in a case where the oblique line illustrated in (a) of FIG. 21 is subjected to the sharpening process in the signal processing device 500c or the signal processing device 500d, this oblique line is emphasized compared to the oblique line illustrated in (b) of FIG. 21, so that the sharpened image looks with higher image quality than the image illustrated in (b) of FIG. 21.

(Setting of Degree of Sharpening According to Two-Dimensional Filter)

In the present embodiment as well as in First Embodiment, it is preferable that the degree of sharpening by the sharpening process section 100A and the sharpening process section 100B is set according to the degree of attenuating frequency components in oblique directions of an image by the two-dimensional filter 200. The setting is the same as that described in First Embodiment and an explanation thereof is omitted here.

Third Embodiment

In the present embodiment, a configuration is explained in which a degree of sharpening is changed in accordance with an amount of reduction in frequency components of oblique lines included in an original image. The following description will discuss an embodiment of the present invention with reference to FIGS. 24 and 25. A signal processing device 500 in accordance with the present embodiment is referred to as a signal processing device 500e. For convenience, members having the same functions as those in First Embodiment are given the same reference signs and explanations thereof are omitted unless otherwise stated.

(Configuration of Signal Processing Device)

The following describes a configuration of the signal processing device 500e with reference to FIG. 24. FIG. 24 is a block diagram illustrating a configuration of the signal processing device 500e. As illustrated in FIG. 24, the signal processing device 500e includes a two-dimensional filter 200, a sharpening unit 150, a sharpening unit (sub-sharpening means) 152, a difference determination section (difference determination means) 300, and a signal output section (signal output means) 320.

The two-dimensional filter 200 and the sharpening unit 150 are identical with those in First Embodiment. However, a sharpening process section 100B of the sharpening unit 150 supplies a sharpened signal S102 to a connection point In1.

The sharpening unit 152 sharpens an input signal SA. The sharpening unit 152 includes a sharpening process section 100C (horizontal sub-sharpening means) and a sharpening process section 100D (vertical sub-sharpening means) which are cascade-connected with each other.

The sharpening process section 100C carries out a sharpening process, in a horizontal direction, on an image indicated by an input signal. The sharpening process section 100C has the same configuration as that of the sharpening process section 100A except that a degree of sharpening by the sharpening process section 100C is smaller than that by the sharpening process section 100A, as later described. A harmonic outputted from the sharpening process section 100C is referred to as a sharpened signal S103 (horizontal sub-sharpened signal).

The sharpening process section 100D carries out a sharpening process, in a vertical direction, on an image indicated by an input signal. The sharpening process section 100D has the same configuration as that of the sharpening process section 100B except that a degree of sharpening by the sharpening process section 100D is smaller than that by the sharpening process section 100B, as later described. A harmonic outputted from the sharpening process section 100D is referred to as a sharpened signal S104 (vertical sub-sharpened signal).

As illustrated in FIG. 24, the sharpening process section 100C is provided at an upper stage of cascade connection, and the input signal SA is supplied to the sharpening process section 100C. The sharpening process section 100D is provided at a lower stage of the cascade connection, and the sharpened signal S103 is supplied to the sharpening process section 100D. In the present embodiment, the sharpened signal S104 outputted from the sharpening process section 100D is supplied to a connection point In2.

Note that settings are carried out as described in at least one of the following (1) and (2) so that (i) the degree of sharpening by the sharpening process section 100C is smaller than that by the sharpening process section 100A and (ii) the degree of sharpening by the sharpening process section 100D is smaller than that of the sharpening process section 100B.

(1) A scale factor $\alpha$ to be multiplied by a sign change signal S41 by a limiter 51 included in the sharpening process section 100C (hereinafter referred to as "α1") is set to be smaller than a scale factor $\alpha$ to be multiplied by a sign change signal S41 by a limiter 51 included in the sharpening process section 100A (hereinafter referred to as "α2"). For example, α1 is set to be approximately one third of α2. Similarly, a scale factor $\alpha$ to be multiplied by a sign change signal S41 by a limiter 51 included in the sharpening process section 100D (hereinafter referred to as "α3") is set to be smaller than a scale factor $\alpha$ to be multiplied by a sign change signal S41 by the limiter 51 included in the sharpening process section 100B (hereinafter referred to as "α4"). For example, α3 is set to be approximately one third of α4.

By the setting, the sign change signals S41 in the sharpening process section 100C and the sharpening process section 100D become smaller in amplitude than those in the sharpening process section 100A and the sharpening process section 100B, respectively. Consequently, nonlinear process signals S12 become smaller in amplitude. This causes the sharpening process section 100C and the sharpening process section 100D to carry out smaller degrees of sharpening, as compared to the sharpening process section 100A and the sharpening process section 100B, respectively.

(2) A coefficient Ck of a filter 110 included in the sharpening process section 100C is set so that a less amount of frequency components are to be passed by the filter 110, and a coefficient Ck of a filter 110 included in the sharpening process section 100A is set so that a more amount of frequency components are to be passed by the filter 110. Similarly, a coefficient Ck of a filter 110 included in the sharpening process section 100D is set so that a less amount of frequency components are to be passed by the filter 110, and a coefficient Ck of a filter 110 included in the sharpening process section 100B is set so that a more amount of frequency components are to be passed by the filter 110.

By the setting, high band signals SH1 in the sharpening process section 100C and the sharpening process section 100D become smaller than those in the sharpening process section 100A and the sharpening process section 100B, respectively. Consequently, nonlinear process signals S12 become smaller in amplitude. This causes the sharpening process section 100C and the sharpening process section 100D to carry out smaller degrees of sharpening, as compared to the sharpening process section 100A and the sharpening process section 100B, respectively.

The difference determination section 300 detects a degree of reduction in frequency components in an oblique direction by the two-dimensional filter 200. Specifically, the difference determination section 300 (i) calculates a difference between an input signal SA and a filter signal S200 for each block region constituted by a plurality of adjacent pixels and (ii) determines whether or not the difference thus calculated is equal to or larger than a predetermined value (hereinafter referred to as "predetermined value TH"). The block region can be any of various regions such as those constituted by (1) consecutive two pixels (i.e., (a) a certain pixel and a pixel on the right of the certain pixel or (b) a certain pixel and a pixel on the left of the certain pixel), (2) consecutive three pixels (i.e., a certain pixel and pixels on the right and left of the certain pixel), (3) adjacent five pixels (e.g., a certain pixel and pixels positioned above, below, on the right, and on the left, of the certain pixel), and (4) 16 pixels, i.e., 4 pixels×4 pixels. Note, however, that the block region is not limited to the above examples.

The difference determination section 300 then notifies the signal output section 320 of the determination result for each block region.

Note that the difference determination section 300 includes as appropriate a delay element for adjusting timing between the input signal SA and the filter signal S200.

The signal output section 320 is a switch for switching between (i) a connection of a connection point Out to the connection point In1 and (ii) a connection of the connection point Out to the connection point In2, in accordance with a determination result received from the difference determination section 300.

Specifically, in a case where a difference between the input signal SA and the filter signal S200 is equal to or larger than the predetermined value TH, the signal output section 320 connects the connection point Out to the connection point In1. In this case, the sharpened signal S102 supplied from the sharpening process section 100B is outputted as an output signal SO from the signal output section 320. On the other hand, in a case where the difference between the input signal SA and the filter signal S200 is smaller than the predetermined value TH, the signal output section 320 connects the connection point Out to the connection point In2. In this case, the sharpened signal S104 supplied from the sharpening process section 100D is outputted as an output signal SO from the signal output section 320.

Note that, at least any of the sharpening unit 150, the sharpening unit 152, and the signal output section 320 includes as appropriate a delay element for adjusting timing between the sharpened signal S102 and the sharpened signal S104.

With the configuration, the signal processing device 500e switches the output signals SO in accordance with the degree of reduction in frequency components in oblique directions by the two-dimensional filter 200, and outputs the output signal SO.

(Modification Example)

In the present embodiment as well as in First Embodiment, the sharpening process section 100A may be provided at a stage earlier than that of the sharpening process section 100B, or vice versa. The signal processing device 500 in accordance with the modification example is referred to as a signal processing device 500f. FIG. 25 is a block diagram illustrating a configuration of the signal processing device 500f.

As illustrated in FIG. 25, the signal processing device 500f includes (i) a sharpening unit (sharpening means) 151 instead of the sharpening unit 150 of the signal processing device 500e and (ii) a sharpening unit (sub-sharpening means) 153 instead of the sharpening unit 152 of the signal processing device 500e.

In this case, a filter signal S200 is supplied to the sharpening process section 100B. Further, a sharpened signal S102 outputted from the sharpening process section 100B is supplied to the sharpening process section 100A. Then, the sharpening process section 100A supplies a sharpened signal S101 to a connection point In1 of the signal output section 320.

Moreover, an input signal SA is supplied to the sharpening process section 100D. Further, a sharpened signal S104 outputted from the sharpening process section 100D is supplied to the sharpening process section 100C. Then, the sharpening process section 100C supplies a sharpened signal S103 to a connection point In2 of the signal output section 320.

(How Image Looks after being Sharpened)

As described above, in the signal processing device 500e or the signal processing device 500f, the filter signal S200 is sharpened and outputted for a block region whose amount of reduction in frequency components of oblique lines is large, and the input signal SA is sharpened and outputted for a block region whose amount of reduction in frequency components of oblique lines is small. That is, an appropriate degree of sharpening can be carried out in accordance with the amount of reduced oblique lines. Therefore, for example, in a case where the oblique line illustrated in (a) of FIG. 21 is subjected to the sharpening process in the signal processing device 500e or the signal processing device 500f, the oblique line of (a) of FIG. 21 is more emphasized than the oblique line illustrated in (b) of FIG. 21. This allows a sharpened image to have higher image quality than (b) of FIG. 21.

(Setting of Degree of Sharpening According to Two-Dimensional Filter)

As with First Embodiment, in the present embodiment also, it is preferable that the degree of sharpening by the sharpening process section 100A and the sharpening process section 100B is set according to the degree of attenuating a frequency component in an oblique direction of an image by the two-dimensional filter 200. This setting is identical with that explained in First Embodiment, and is therefore not explained repeatedly.

[Additional Note]

Lastly, blocks of the signal processing device 500 each can be configured by hardware with the use of a logic circuit formed on an integrated circuit (IC chip) or by software with the use of CPU (Central Processing Unit) as follows.

In the case where each block of the signal processing device 500 is configured by software, the signal processing device 500 (in particular, the sharpening process section 100) includes a CPU, a ROM (Read Only Memory), a RAM (Random Access Memory), and a storage device (storage medium) such as a memory. The CPU executes instructions of control programs for realizing the functions. In the ROM, the programs are stored. Into the RAM, the programs are loaded. In the storage device, the programs and various data are stored. The objective of the present invention can also be achieved, by (i) supplying a storage medium, in which program codes (executable programs, intermediate code programs, source programs) of programs for controlling the signal processing device 500 configured by software for realizing the functions, are stored so that a computer can read them, to the signal processing device 500, and then (ii) causing the computer (or CPU or MPU) to read and execute the program codes stored in the storage medium.

The storage medium can be, for example, a tape, such as a magnetic tape or a cassette tape; a disk including (i) a magnetic disk such as a floppy (Registered Trademark) disk or a hard disk and (ii) an optical disk such as CD-ROM, MO, MD, DVD, or CD-R; a card such as an IC card (memory card) or an optical card; a semiconductor memory such as a mask ROM, EPROM, EEPROM, or flash ROM; or a logic circuit such as PLD (Programmable Logic Device).

Alternatively, the signal processing device 500 can be configured to connect with a communications network so that the program codes can be supplied to the signal processing device 500 via the communications network. The communications network is not limited to a specific one. The communications network can be, for example, the Internet, an intranet, extranet, LAN, ISDN, VAN, CATV communications network, virtual private network, telephone line network, mobile communications network, or satellite communications network. The transfer medium which constitutes the communications network is not limited to a specific one. The transfer medium can be, for example, wired line such as IEEE 1394, USB, electric power line, cable TV line, telephone line, or ADSL line; or wireless such as infrared radiation (IrDA, remote control), Bluetooth (Registered Trademark), IEEE 802.11 wireless, HDR (High Data Rate), NFC (Near Field Communication), DLNA (Digital Living Network Alliance), mobile telephone network, satellite line, or terrestrial digital network.

As above described in this specification, the term "means" does not necessarily indicates a physical means. Therefore, functions of the means may be realized by software. Further, a function of one of the means may be realized by two or more physical means. Alternatively, functions of two or more of the means may be realized by one (1) physical means.

Furthermore, the signal processing device of the present invention may be arranged such that the horizontal sharpening means is provided at the upper stage of the cascade-connection, and the vertical sharpening means is provided at the lower stage of the cascade-connection.

With the arrangement, the sharpening process is carried out in a horizontal direction and then in a vertical direction, so that it is possible to appropriately sharpen an image in which a frequency component in the horizontal direction is higher than a frequency component in the vertical direction (e.g. image of television broadcasting).

Furthermore, the signal processing device of the present invention may be arranged such that the vertical sharpening means is provided at the upper stage of the cascade-connection, and the horizontal sharpening means is provided at the lower stage of the cascade-connection.

With the arrangement, the sharpening process is carried out in a vertical direction and then in a horizontal direction, so that it is possible to appropriately sharpen an image in which a frequency component in the vertical direction is higher than a frequency component in the horizontal direction.

Furthermore, the signal processing device of the present invention may be arranged so as to further include: direct current component removing means for removing at least a direct current component out of frequency components in the input signal, before the high frequency component removing means generates the obliquely reduced signal; and input signal addition means for adding the input signal to the sharpened signal and outputting a signal obtained by the addition.

With the arrangement, at least a direct current component out of frequency components in the input signal is removed before the obliquely reduced signal is generated. Furthermore, the input signal is added to the sharpened signal and a signal obtained by the addition is outputted.

Accordingly, an oblique line included in an image indicated by the input signal can be incorporated into an image indicated by the sharpened signal. Furthermore, since the obliquely reduced signal is free from at least a direct current component, addition of the input signal to the sharpened signal does not emphasize a direct current component.

This allows further improving image quality of the sharpened image and further giving feeling that resolution is increased.

Furthermore, the signal processing device of the present invention may be arranged so as to further include:

sub-sharpening means for receiving the input signal and outputting a sub-sharpened signal obtained by sharpening the input signal;

difference determination means for calculating a difference between the input signal and the obliquely reduced signal with respect to each block region constituted by a plurality of adjacent pixels and determining whether the calculated difference is not less than a predetermined value; and signal output means for receiving the sharpened signal and the sub-sharpened signal, and outputting the sharpened signal with respect to the block region whose difference calculated by the difference determination means is not less than the predetermined value, and outputting the sub-sharpened signal with respect to the block region whose difference calculated by the difference determination means is less than the predetermined value, the sub-sharpening means including:

horizontal sub-sharpening means for outputting a horizontal sub-sharpened signal obtained by sharpening a signal indicative of a pixel group constituted by pixels adjacently aligned in a horizontal direction of an image indicated by an incoming signal; and vertical sub-sharpening means for outputting a vertical sub-sharpened signal obtained by sharpening a signal indicative of a pixel group constituted by pixels adjacently aligned in a vertical direction of an image indicated by an incoming signal, the horizontal sub-sharpening means and the vertical sub-sharpening means being cascade-connected with each other, the input signal being inputted to the horizontal sub-sharpening means or the vertical sub-sharpening means at an upper stage of the cascade-connection, the sub-sharpening means outputting, as the sub-sharpened signal, a signal outputted from the horizontal sub-sharpening means or the vertical sub-sharpening means at a lower stage of the cascade-connection, the horizontal sub-sharpening means including:

horizontal sub-low-frequency component removing means for removing at least a direct current component from frequency components in the signal indicative of the pixel group constituted by pixels adjacently aligned in the horizontal direction of the image indicated by the incoming signal, so as to generate and output a horizontal sub-low-frequency-free signal;

horizontal sub-nonlinear process means for receiving the horizontal sub-low-frequency-free signal, generating a horizontal sub-nonlinear process signal (i) in which positive and negative signs of the horizontal sub-low-frequency-free signal are retained and (ii) which broadly monotonically increases nonlinearly with respect to the horizontal sub-low-frequency-free signal when values of the horizontal sub-low-frequency-free signal are at least in the vicinity of 0, and outputting the horizontal sub-nonlinear process signal; and horizontal sub-addition means for adding the incoming signal incoming to the horizontal sub-sharpening means to the horizontal sub-nonlinear process signal, so as to generate the horizontal sub-sharpened signal, and the vertical sub-sharpening means including:

vertical sub-low-frequency component removing means for removing at least a direct current component from frequency components in the signal indicative of the pixel group constituted by pixels adjacently aligned in the vertical direction of the image indicated by the incoming signal, so as to generate and output a vertical sub-low-frequency-free signal;

vertical sub-nonlinear process means for receiving the vertical sub-low-frequency-free signal, generating a vertical sub-nonlinear process signal (i) in which positive and negative signs of the vertical sub-low-frequency-free signal are retained and (ii) which broadly monotonically increases nonlinearly with respect to the vertical sub-low-frequency-free signal when values of the vertical sub-low-frequency-free signal are at least in the vicinity of 0, and outputting the vertical sub-nonlinear process signal; and vertical sub-addition means for adding the incoming signal incoming to the vertical sub-sharpening means to the vertical sub-nonlinear process signal, so as to generate the vertical sub-sharpened signal.

With the arrangement, furthermore, the input signal is sequentially subjected to two sharpening processes and a sub-sharpened signal is outputted.

One of the two sharpening processes is a process for generating a horizontal sub-sharpened signal which is a harmonic obtained by sharpening a signal indicative of a pixel group constituted by pixels adjacently aligned in a horizontal direction of an image indicated by an incoming signal. In generation of the horizontal sub-sharpened signal, initially, at least a direct current component is removed from frequency components in the signal indicative of the pixel group constituted by pixels adjacently aligned in the horizontal direction of the image indicated by the incoming signal, so as to generate a horizontal sub-low-frequency-free signal. Then, a horizontal sub-nonlinear process signal (i) in which positive and negative signs of the horizontal sub-low-frequency-free signal are retained and (ii) which broadly monotonically increases nonlinearly with respect to the horizontal sub-low-frequency-free signal when values of the horizontal sub-low-frequency-free signal are at least in the vicinity of 0 is generated. Then, the incoming signal is added to the horizontal sub-low-frequency-free signal so as to generate a horizontal sub-sharpened signal.

The other of the two sharpening processes is a process for generating a vertical sub-sharpened signal which is a harmonic obtained by sharpening a signal indicative of a pixel group constituted by pixels adjacently aligned in a vertical direction of an image indicated by an incoming signal. In generation of the vertical sub-sharpened signal, initially, at least a direct current component is removed from frequency components in the signal indicative of the pixel group constituted by pixels adjacently aligned in the vertical direction of the image indicated by the incoming signal, so as to generate a vertical sub-low-frequency-free signal. Then, a vertical sub-nonlinear process signal (i) in which positive and negative signs of the vertical sub-low-frequency-free signal are retained and (ii) which broadly monotonically increases nonlinearly with respect to the vertical sub-low-frequency-free signal when values of the vertical sub-low-frequency-free signal are at least in the vicinity of 0 is generated. Then, the incoming signal is added to the vertical sub-low-frequency-free signal so as to generate a vertical sub-sharpened signal.

Therefore, by carrying out the two sharpening processes, it is possible to output, as a sub-sharpened signal, a signal obtained by carrying out a nonlinear process on frequency components in horizontal and vertical directions of an image indicated by the input signal without carrying out a nonlinear process on frequency components in directions other than the horizontal and vertical directions of the image.

The horizontal sub-sharpened signal is generated by adding the incoming signal to the horizontal sub-nonlinear process signal having been subjected to a nonlinear process such as squaring the horizontal sub-low-frequency-free signal. The generated signal retains positive and negative signs of the horizontal sub-low-frequency-free signal.

Similarly, the vertical sub-sharpened signal is generated by adding the incoming signal to the vertical sub-nonlinear process signal having been subjected to a nonlinear process such as squaring the vertical sub-low-frequency-free signal. The generated signal retains positive and negative signs of the vertical sub-low-frequency-free signal.

Therefore, the horizontal sub-sharpened signal and the vertical sub-sharpened signal include frequency components at high bandwidth which are not included in the input signal. Consequently, the horizontal sub-sharpened signal and the vertical sub-sharpened signal include frequency components higher than a Nyquist frequency which is ½ of a sampling frequency when the input signal is made discrete.

A difference between the input signal and the obliquely reduced signal is calculated with respect to each block region constituted by a plurality of adjacent pixels, and whether the calculated difference is not less than a predetermined value is determined, and the sharpened signal is outputted with respect to a block region whose difference is not less than the predetermined value, and the sub-sharpened signal is outputted with respect to a block region whose difference is less than the predetermined value.

That is, with respect to a block region whose amount of reduction in frequency components of oblique lines is large, the sharpened signal obtained by sharpening the obliquely reduced signal is outputted, and with respect to a block region whose amount of reduction in frequency components of oblique lines is small, the sub-sharpened signal obtained by sharpening the input signal is outputted.

Therefore, it is possible to switch output signals according to the amount of reduction in frequency components of oblique lines. Accordingly, by setting the degree of sharpening by the sharpening means differently from the degree of sharpening by the sub-sharpening means, it is possible to change the degree of sharpening according to the amount of reduction in frequency components of oblique lines.

Furthermore, the signal processing device of the present invention may be arranged such that in a case where the horizontal sharpening means is provided at an upper stage than the vertical sharpening means, the horizontal sub-sharpening means is provided at an upper stage than the vertical sub-sharpening means, and in a case where the horizontal sharpening means is provided at a lower stage than the vertical sharpening means, the horizontal sub-sharpening means is provided at a lower stage than the vertical sub-sharpening means.

With the arrangement, the order of the two sharpening processes carried out on the input signal can be identical with the order of the two sharpening processes carried out on the obliquely reduced signal.

Furthermore, the signal processing device of the present invention may be arranged such that the horizontal nonlinear process means includes horizontal amplitude adjusting means for adjusting amplitude of the horizontal nonlinear process signal by multiplying the horizontal nonlinear process signal by a first predetermined scale factor, the vertical nonlinear process means includes vertical amplitude adjusting means for adjusting amplitude of the vertical nonlinear process signal by multiplying the vertical nonlinear process signal by a second predetermined scale factor, the horizontal sub-nonlinear process means includes horizontal sub-amplitude adjusting means for adjusting amplitude of the horizontal sub-nonlinear process signal by multiplying the horizontal sub-nonlinear process signal by a third predetermined scale factor, the vertical sub-nonlinear process means includes vertical sub-amplitude adjusting means for adjusting amplitude of the vertical sub-nonlinear process signal by multiplying the vertical sub-nonlinear process signal by a fourth predetermined scale factor, and the first predetermined scale factor is larger than the second predetermined scale factor, and the third predetermined scale factor is larger than the fourth predetermined scale factor.

With the arrangement, amplitudes of signals outputted from the horizontal sharpening process means, the vertical sharpening process means, the horizontal sub-sharpening process means, and the vertical sub-sharpening process means can be adjusted to have appropriate sizes, respectively. Furthermore, the amplitude of a signal outputted from the horizontal sharpening process means can be larger than that of a signal outputted from the horizontal sub-sharpening process means, and the amplitude of a signal outputted from the vertical sharpening process means can be larger than that of a signal outputted from the vertical sub-sharpening process means.

Therefore, a block region whose amount of reduction in frequency components of oblique lines is large can be more highly (strongly) sharpened than a block region whose amount of reduction in frequency components of oblique lines is small.

Furthermore, the signal processing device of the present invention may be arranged such that at least one of the horizontal nonlinear process means, the vertical nonlinear process means, the horizontal sub-nonlinear process means, and the vertical sub-nonlinear process means includes:

even exponentiation operation means for generating an even exponentiation signal by raising an incoming signal to an even exponent not less than 2; and sign changing means for reversing positive and negative signs of a part of the even exponentiation signal which part is different in sign from the incoming signal, and the even exponentiation signal including the signs having been reversed by the sign changing means is outputted.

With the arrangement, the even exponentiation signal is generated by raising the incoming signal to an even exponent not less than 2, and positive and negative signs of a part of the even exponentiation signal which part is different in sign from the frequency component before the exponentiation are reversed, and the signal including signs having been reversed is outputted.

Since the incoming signal is raised to an even exponent not less than 2 and the resulting signal is outputted while retaining positive and negative signs of the low-frequency-free signal before the exponentiation, a signal obtained by adding the output signal and the incoming signal has a high frequency component which is not included in the incoming signal.

Therefore, it is possible to further steepen rising and falling of a signal corresponding to an edge portion included in a signal to be sharpened, compared with a conventional method employing linear operation.

Furthermore, the signal processing device of the present invention may be arranged such that at least one of the horizontal nonlinear process means, the vertical nonlinear process means, the horizontal sub-nonlinear process means, and the vertical sub-nonlinear process means includes:

even exponentiation operation means for generating an even exponentiation signal by raising an incoming signal to an even exponent not less than 2;

differentiation means for generating a differential signal by differentiating the even exponentiation signal; and sign changing means for reversing positive and negative signs of a part of the differential signal which part is different in sign from the incoming signal, and the differential signal including the signs having been reversed by the sign changing means is outputted.

With the arrangement, the incoming signal is raised to an even exponent not less than 2 to generate an even exponentiation signal, and the even exponentiation signal is differentiated to generate a differential signal, and positive and negative signs of a part of the differential signal which part is different in sign from the incoming signal are reversed, and the differential signal including the signs having been reversed is outputted.

As described above, the incoming signal is raised to an even exponent not less than 2, and the resulting signal is differentiated to remove a direct current component that may be included in the signal, and the signal is outputted while retaining positive and negative signs of the incoming signal before the exponentiation. Accordingly, a signal obtained by adding the output signal and the incoming signal has a high frequency component which is not included in the incoming signal.

Therefore, it is possible to further steepen rising and falling of a signal corresponding to an edge portion included in a signal to be sharpened, compared with a conventional method using linear operation. Since the signal after the exponentiation is differentiated to remove a direct current component that may be included in the signal, it is possible to further steepen rising and falling of the signal, compared with a case where a direct current component that may be included in the signal after the exponentiation is not removed.

Furthermore, the signal processing device of the present invention may be arranged such that at least one of the horizontal nonlinear process means, the vertical nonlinear process means, the horizontal sub-nonlinear process means, and the vertical sub-nonlinear process means includes:

odd exponentiation operation means for raising an incoming signal to an odd exponent not less than 3, and a resulting signal obtained by raising by the odd exponentiation operation means is outputted.

With the arrangement, the incoming signal is raised to an odd exponent not less than 3, and the resulting signal is outputted.

Since the incoming signal is raised to an odd exponent not less than 3 and the resulting signal is outputted, a signal obtained by adding the output signal and the incoming signal has a high frequency component which is not included in the incoming signal.

Therefore, it is possible to further steepen rising and falling of a signal corresponding to an edge portion included in a signal to be sharpened, compared with a conventional method employing linear operation.

Furthermore, the signal processing device of the present invention may be arranged such that at least one of the horizontal nonlinear process means, the vertical nonlinear process means, the horizontal sub-nonlinear process means, and the vertical sub-nonlinear process means includes:

square root operation means for generating a square root signal by multiplying (i) a square root of an absolute value of a value calculated by dividing an incoming signal by a possible maximum value of the incoming signal, by (ii) the maximum value; and sign changing means for reversing positive and negative signs of a part of the square root signal which part is different in sign from the incoming signal, and the square root signal including the signs having been reversed by the sign changing means is outputted.

With the arrangement, a square root signal generated by multiplying (i) a square root of an absolute value of a value calculated by dividing the incoming signal by a possible maximum value of the incoming signal (i.e. normalized incoming signal) by (ii) the maximum value is outputted while retaining positive and negative signs of the incoming signal.

Therefore, a signal obtained by adding the output signal and the incoming signal includes a high frequency component which is not included in the incoming signal.

Therefore, it is possible to further steepen rising and falling of a signal corresponding to an edge portion included in a signal to be sharpened, compared with a conventional method employing linear operation.

Furthermore, the signal processing device of the present invention may be arranged such that at least one of the horizontal nonlinear process means, the vertical nonlinear process means, the horizontal sub-nonlinear process means, and the vertical sub-nonlinear process means, when values of an incoming signal are around 0, outputs a signal having an absolute value larger than that of the incoming signal.

With the arrangement, when values of the incoming signal are around 0, a signal having an absolute value larger than that of the incoming signal is outputted.

Consequently, in a zone where values of the incoming signal are around 0, the value of a signal to be added to a signal to be sharpened when generating an output signal can be larger than the value of the signal to be sharpened.

Therefore, in a zone where values of a low-frequency-free signal are around 0, it is possible to further steepen rising and falling of a signal corresponding to an edge portion included in a signal to be sharpened.

Furthermore, the signal processing device of the present invention may be arranged such that at least one of the horizontal low-frequency component removing means, the vertical low-frequency component removing means, the horizontal sub-low-frequency component removing means, and the vertical sub-low-frequency component removing means is a high-pass filter having 3 or more taps.

With the arrangement, since the high-pass filter having 3 or more taps is used, it is possible to appropriately remove at least a direct current component from a signal to be sharpened.

Accordingly, a signal obtained by adding (i) a signal obtained by carrying out a nonlinear process with respect to a signal obtained by removing a direct current component from a signal to be sharpened and (ii) the signal to be sharpened has a high frequency component which is not included in the signal to be sharpened.

Therefore, it is possible to further steepen rising and falling of a signal corresponding to an edge portion included in a signal to be sharpened, compared with a conventional method employing linear operation.

Furthermore, the signal processing device of the present invention may be arranged such that at least one of the horizontal low-frequency component removing means, the vertical low-frequency component removing means, the horizontal sub-low-frequency component removing means, and the vertical sub-low-frequency component removing means further includes:

low-level signal removing means for changing, out of signal values of an outgoing signal, signal values whose absolute values are lower than a predetermined lower limit to 0, and high-level signal removing means for changing, out of the signal values of the outgoing signal, signal values whose absolute values are higher than a predetermined upper limit in such a manner that the absolute values are not higher than the predetermined upper limit while maintaining signs of that signal values.

With the arrangement, out of the signal values of the outgoing signal, signal values whose absolute values are lower than a predetermined lower limit are changed to 0, and signal values whose absolute values are higher than a predetermined upper limit are changed in such a manner that the absolute values are not higher than the predetermined upper limit while maintaining signs of that signal values.

Consequently, it is possible to remove a noise included in the outgoing signal, and it is possible to prevent a high frequency component having large energy in the outgoing signal from being amplified by a nonlinear process.

Therefore, the outgoing signal does not include a noise, and it is possible to prevent the high frequency component having large energy from being amplified.

The signal processing device may be realized by a computer. In this case, the present invention also encompasses a control program for the signal processing device which causes a computer to operate as the means of the signal processing device to realize the signal processing device by the computer, and a computer-readable storage medium in which the control program is stored.

Furthermore, a chip including the aforementioned integrated circuit is also encompassed in the present invention.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to a device which processes a digital signal indicative of an image. In particular, the present invention is appropriately applicable to a display device which displays a still image and a moving image etc.

REFERENCE SIGNS LIST

11 High-frequency component extracting section (horizontal low frequency component removing means, vertical low frequency component removing means, horizontal sub-low frequency component removing means, vertical sub-low frequency component removing means, horizontal low frequency component removing circuit, vertical low frequency component removing circuit)

15 Addition section (horizontal addition means, vertical addition means, horizontal sub-addition means, vertical sub-addition means, horizontal addition circuit, vertical addition circuit)

21 Nonlinear operation section (even exponentiation operation means, square root operation means)

22 Nonlinear operation section (odd exponentiation operation means)

31 Differentiation section (differentiation means)

41 Sign changing section (sign changing means)

51 Limiter (horizontal amplitude adjusting means, vertical amplitude adjusting means, horizontal sub-amplitude adjusting means, vertical sub-amplitude adjusting means)

100, 100a-100e sharpening process section (horizontal sharpening means, vertical sharpening means, horizontal sub-sharpening means, vertical sub-sharpening means, horizontal sharpening circuit, vertical sharpening circuit)

100A Sharpening process section (horizontal sharpening means, horizontal sharpening circuit)

100B Sharpening process section (vertical sharpening means, vertical sharpening circuit)

100C Sharpening process section (horizontal sub-sharpening means)

100D Sharpening process section (vertical sub-sharpening means)

102,102a-102e Nonlinear process section (horizontal nonlinear process means, vertical nonlinear process means, horizontal sub-nonlinear process means, vertical sub-nonlinear process means, horizontal nonlinear process circuit, vertical nonlinear process circuit)
150, 151 Sharpening unit (sharpening means, sharpening circuit)
152, 153 Sub-sharpening unit (sub-sharpening means)
200 Two-dimensional filter (high frequency component removing means, high frequency component removing circuit)
220 High-pass filter (direct current component removing means)
240 Addition section (input signal addition means)
300 Difference determination section (difference determination means)
320 Signal output section (signal output means)
500, 500a-500f Signal processing device (integrated circuit)
S11 High-frequency signal (horizontal low-frequency-free signal, vertical low-frequency-free signal, horizontal sub-low-frequency-free signal, vertical sub-low-frequency-free signal)
S12 Nonlinear process signal (horizontal nonlinear process signal, vertical nonlinear process signal, horizontal sub-nonlinear process signal, vertical sub-nonlinear process signal)
S21 Nonlinear signal (even exponentiation signal, square root signal)
S22 Nonlinear signal
S31 Differential signal
S101 Sharpened signal (horizontal sharpened signal)
S102 Sharpened signal (vertical sharpened signal)
S103 Sharpened signal (horizontal sub-sharpened signal)
S104 Sharpened signal (vertical sub-sharpened signal)
S200 Filter signal (obliquely reduced signal)
S220 High band signal
SA Input signal
SO Output signal

The invention claimed is:

1. A signal processing device for subjecting an input signal indicative of an image to a process of sharpening the image and outputting a signal indicative of the sharpened image, comprising:
high frequency component removing means for removing, from the input signal, a high frequency component out of frequency components in directions other than a horizontal direction and a vertical direction of the image indicated by the input signal, so as to generate an obliquely reduced signal; and
sharpening means for receiving the obliquely reduced signal and outputting a sharpened signal obtained by sharpening the obliquely reduced signal,
the sharpening means including:
horizontal sharpening means for outputting a horizontal sharpened signal obtained by sharpening a signal indicative of a pixel group constituted by pixels adjacently aligned in a horizontal direction of an image indicated by an incoming signal; and
vertical sharpening means for outputting a vertical sharpened signal obtained by sharpening a signal indicative of a pixel group constituted by pixels adjacently aligned in a vertical direction of an image indicated by an incoming signal,
the horizontal sharpening means and the vertical sharpening means being cascade-connected with each other,
the obliquely reduced signal being inputted to the horizontal sharpening means or the vertical sharpening means at an upper stage of the cascade-connection,
the sharpening means outputting, as the sharpened signal, a signal outputted from the horizontal sharpening means or the vertical sharpening means at a lower stage of the cascade-connection,
the horizontal sharpening means including:
horizontal low-frequency component removing means for removing at least a direct current component from frequency components in the signal indicative of the pixel group constituted by pixels adjacently aligned in the horizontal direction of the image indicated by the incoming signal, so as to generate and output a horizontal low-frequency-free signal;
horizontal nonlinear process means for receiving the horizontal low-frequency-free signal, generating a horizontal nonlinear process signal (i) in which positive and negative signs of the horizontal low-frequency-free signal are retained and (ii) which broadly monotonically increases nonlinearly with respect to the horizontal low-frequency-free signal when values of the horizontal low-frequency-free signal are at least in the vicinity of 0, and outputting the horizontal nonlinear process signal; and
horizontal addition means for adding the incoming signal incoming to the horizontal sharpening means to the horizontal nonlinear process signal, so as to generate the horizontal sharpened signal, and
the vertical sharpening means including:
vertical low-frequency component removing means for removing at least a direct current component from frequency components in the signal indicative of the pixel group constituted by pixels adjacently aligned in the vertical direction of the image indicated by the incoming signal, so as to generate and output a vertical low-frequency-free signal;
vertical nonlinear process means for receiving the vertical low-frequency-free signal, generating a vertical nonlinear process signal (i) in which positive and negative signs of the vertical low-frequency-free signal are retained and (ii) which broadly monotonically increases nonlinearly with respect to the vertical low-frequency-free signal when values of the vertical low-frequency-free signal are at least in the vicinity of 0, and outputting the vertical nonlinear process signal; and
vertical addition means for adding the incoming signal incoming to the vertical sharpening means to the vertical nonlinear process signal, so as to generate the vertical sharpened signal.

2. The signal processing device as set forth in claim 1, wherein the horizontal sharpening means is provided at the upper stage of the cascade-connection, and the vertical sharpening means is provided at the lower stage of the cascade-connection.

3. The signal processing device as set forth in claim 1, wherein the vertical sharpening means is provided at the upper stage of the cascade-connection, and the horizontal sharpening means is provided at the lower stage of the cascade-connection.

4. The signal processing device as set forth in claim 1, further comprising:
direct current component removing means for removing at least a direct current component out of frequency components in the input signal, before the high frequency component removing means generates the obliquely reduced signal; and input signal addition means for adding the input signal to the sharpened signal and outputting a signal obtained by the addition.

5. The signal processing device as set forth in claim 1, further comprising:

sub-sharpening means for receiving the input signal and outputting a sub-sharpened signal obtained by sharpening the input signal;

difference determination means for calculating a difference between the input signal and the obliquely reduced signal with respect to each block region constituted by a plurality of adjacent pixels and determining whether the calculated difference is not less than a predetermined value; and signal output means for receiving the sharpened signal and the sub-sharpened signal, and outputting the sharpened signal with respect to the block region whose difference calculated by the difference determination means is not less than the predetermined value, and outputting the sub-sharpened signal with respect to the block region whose difference calculated by the difference determination means is less than the predetermined value, the sub-sharpening means including:

horizontal sub-sharpening means for outputting a horizontal sub-sharpened signal obtained by sharpening a signal indicative of a pixel group constituted by pixels adjacently aligned in a horizontal direction of an image indicated by an incoming signal; and vertical sub-sharpening means for outputting a vertical sub-sharpened signal obtained by sharpening a signal indicative of a pixel group constituted by pixels adjacently aligned in a vertical direction of an image indicated by an incoming signal, the horizontal sub-sharpening means and the vertical sub-sharpening means being cascade-connected with each other, the input signal being inputted to the horizontal sub-sharpening means or the vertical sub-sharpening means at an upper stage of the cascade-connection, the sub-sharpening means outputting, as the sub-sharpened signal, a signal outputted from the horizontal sub-sharpening means or the vertical sub-sharpening means at a lower stage of the cascade-connection, the horizontal sub-sharpening means including:

horizontal sub-low-frequency component removing means for removing at least a direct current component from frequency components in the signal indicative of the pixel group constituted by pixels adjacently aligned in the horizontal direction of the image indicated by the incoming signal, so as to generate and output a horizontal sub-low-frequency-free signal;

horizontal sub-nonlinear process means for receiving the horizontal sub-low-frequency-free signal, generating a horizontal sub-nonlinear process signal (i) in which positive and negative signs of the horizontal sub-low-frequency-free signal are retained and (ii) which broadly monotonically increases nonlinearly with respect to the horizontal sub-low-frequency-free signal when values of the horizontal sub-low-frequency-free signal are at least in the vicinity of 0, and outputting the horizontal sub-nonlinear process signal; and horizontal sub-addition means for adding the incoming signal incoming to the horizontal sub-sharpening means to the horizontal sub-nonlinear process signal, so as to generate the horizontal sub-sharpened signal, and the vertical sub-sharpening means including:

vertical sub-low-frequency component removing means for removing at least a direct current component from frequency components in the signal indicative of the pixel group constituted by pixels adjacently aligned in the vertical direction of the image indicated by the incoming signal, so as to generate and output a vertical sub-low-frequency-free signal;

vertical sub-nonlinear process means for receiving the vertical sub-low-frequency-free signal, generating a vertical sub-nonlinear process signal (i) in which positive and negative signs of the vertical sub-low-frequency-free signal are retained and (ii) which broadly monotonically increases nonlinearly with respect to the vertical sub-low-frequency-free signal when values of the vertical sub-low-frequency-free signal are at least in the vicinity of 0, and outputting the vertical sub-nonlinear process signal; and vertical sub-addition means for adding the incoming signal incoming to the vertical sub-sharpening means to the vertical sub-nonlinear process signal, so as to generate the vertical sub-sharpened signal.

6. The signal processing device as set forth in claim 5, wherein in a case where the horizontal sharpening means is provided at an upper stage than the vertical sharpening means, the horizontal sub-sharpening means is provided at an upper stage than the vertical sub-sharpening means, and in a case where the horizontal sharpening means is provided at a lower stage than the vertical sharpening means, the horizontal sub-sharpening means is provided at a lower stage than the vertical sub-sharpening means.

7. The signal processing device as set forth in claim 5, wherein the horizontal nonlinear process means includes horizontal amplitude adjusting means for adjusting amplitude of the horizontal nonlinear process signal by multiplying the horizontal nonlinear process signal by a first predetermined scale factor, the vertical nonlinear process means includes vertical amplitude adjusting means for adjusting amplitude of the vertical nonlinear process signal by multiplying the vertical nonlinear process signal by a second predetermined scale factor, the horizontal sub-nonlinear process means includes horizontal sub-amplitude adjusting means for adjusting amplitude of the horizontal sub-nonlinear process signal by multiplying the horizontal sub-nonlinear process signal by a third predetermined scale factor, the vertical sub-nonlinear process means includes vertical sub-amplitude adjusting means for adjusting amplitude of the vertical sub-nonlinear process signal by multiplying the vertical sub-nonlinear process signal by a fourth predetermined scale factor, and the first predetermined scale factor is larger than the second predetermined scale factor, and the third predetermined scale factor is larger than the fourth predetermined scale factor.

8. The signal processing device as set forth in claim 1, wherein at least one of the horizontal nonlinear process means, the vertical nonlinear process means, the horizontal sub-nonlinear process means, and the vertical sub-nonlinear process means includes:

even exponentiation operation means for generating an even exponentiation signal by raising an incoming signal to an even exponent not less than 2; and sign changing means for reversing positive and negative signs of a part of the even exponentiation signal which part is different in sign from the incoming signal, and the even exponentiation signal including the signs having been reversed by the sign changing means is outputted.

9. The signal processing device as set forth in claim 1, wherein at least one of the horizontal nonlinear process means, the vertical nonlinear process means, the horizontal sub-nonlinear process means, and the vertical sub-nonlinear process means includes:

even exponentiation operation means for generating an even exponentiation signal by raising an incoming signal to an even exponent not less than 2;

differentiation means for generating a differential signal by differentiating the even exponentiation signal; and sign changing means for reversing positive and negative signs of a part of the differential signal which part is different in sign from the incoming signal, and the differential signal including the signs having been reversed by the sign changing means is outputted.

10. The signal processing device as set forth in claim 1, wherein at least one of the horizontal nonlinear process means, the vertical nonlinear process means, the horizontal sub-nonlinear process means, and the vertical sub-nonlinear process means includes:

odd exponentiation operation means for raising an incoming signal to an odd exponent not less than 3, and a resulting signal obtained by raising by the odd exponentiation operation means is outputted.

11. The signal processing device as set forth in claim 1, wherein at least one of the horizontal nonlinear process means, the vertical nonlinear process means, the horizontal sub-nonlinear process means, and the vertical sub-nonlinear process means includes:

square root operation means for generating a square root signal by multiplying (i) a square root of an absolute value of a value calculated by dividing an incoming signal by a possible maximum value of the incoming signal, by (ii) the maximum value; and sign changing means for reversing positive and negative signs of a part of the square root signal which part is different in sign from the incoming signal, and the square root signal including the signs having been reversed by the sign changing means is outputted.

12. The signal processing device as set forth in claim 1, wherein at least one of the horizontal nonlinear process means, the vertical nonlinear process means, the horizontal sub-nonlinear process means, and the vertical sub-nonlinear process means, when values of an incoming signal are around 0, outputs a signal having an absolute value larger than that of the incoming signal.

13. The signal processing device as set forth in claim 1, wherein at least one of the horizontal low-frequency component removing means, the vertical low-frequency component removing means, the horizontal sub-low-frequency component removing means, and the vertical sub-low-frequency component removing means is a high-pass filter having 3 or more taps.

14. The signal processing device as set forth in claim 1, wherein at least one of the horizontal low-frequency component removing means, the vertical low-frequency component removing means, the horizontal sub-low-frequency component removing means, and the vertical sub-low-frequency component removing means further includes:

low-level signal removing means for changing, out of signal values of an outgoing signal, signal values whose absolute values are lower than a predetermined lower limit to 0, and high-level signal removing means for changing, out of the signal values of the outgoing signal, signal values whose absolute values are higher than a predetermined upper limit in such a manner that the absolute values are not higher than the predetermined upper limit while maintaining signs of that signal values.

15. An integrated circuit for subjecting an input signal indicative of an image to a process of sharpening the image and outputting a signal indicative of the sharpened image, comprising:

a high frequency component removing circuit for removing, from the input signal, a high frequency component out of frequency components in directions other than a horizontal direction and a vertical direction of the image indicated by the input signal, so as to generate an obliquely reduced signal; and a sharpening circuit for receiving the obliquely reduced signal and outputting a sharpened signal obtained by sharpening the obliquely reduced signal, the sharpening circuit including:

a horizontal sharpening circuit for outputting a horizontal sharpened signal obtained by sharpening a signal indicative of a pixel group constituted by pixels adjacently aligned in a horizontal direction of an image indicated by an incoming signal; and a vertical sharpening circuit for outputting a vertical sharpened signal obtained by sharpening a signal indicative of a pixel group constituted by pixels adjacently aligned in a vertical direction of an image indicated by an incoming signal, the horizontal sharpening circuit and the vertical sharpening circuit being cascade-connected with each other, the obliquely reduced signal being inputted to the horizontal sharpening circuit or the vertical sharpening circuit at an upper stage of the cascade-connection, the sharpening circuit outputting, as the sharpened signal, a signal outputted from the horizontal sharpening circuit or the vertical sharpening circuit at a lower stage of the cascade-connection, the horizontal sharpening circuit including:

a horizontal low-frequency component removing circuit for removing at least a direct current component from frequency components in the signal indicative of the pixel group constituted by pixels adjacently aligned in the horizontal direction of the image indicated by the incoming signal, so as to generate and output a horizontal low-frequency-free signal;

a horizontal nonlinear process circuit for receiving the horizontal low-frequency-free signal, generating a horizontal nonlinear process signal (i) in which positive and negative signs of the horizontal low-frequency-free signal are retained and (ii) which broadly monotonically increases nonlinearly with respect to the horizontal low-frequency-free signal when values of the horizontal low-frequency-free signal are at least in the vicinity of 0, and outputting the horizontal nonlinear process signal; and a horizontal addition circuit for adding the incoming signal incoming to the horizontal sharpening circuit to the horizontal nonlinear process signal, so as to generate the horizontal sharpened signal, and the vertical sharpening circuit including:

a vertical low-frequency component removing circuit for removing at least a direct current component from frequency components in the signal indicative of the pixel group constituted by pixels adjacently aligned in the vertical direction of the image indicated by the incoming signal, so as to generate and output a vertical low-frequency-free signal;

a vertical nonlinear process circuit for receiving the vertical low-frequency-free signal, generating a vertical nonlinear process signal (i) in which positive and negative signs of the vertical low-frequency-free signal are retained and (ii) which broadly monotonically increases nonlinearly with respect to the vertical low-frequency-free signal when values of the vertical low-frequency-free signal are at least in the vicinity of 0, and outputting the vertical nonlinear process signal; and a vertical addition circuit for adding the incoming signal incoming to the vertical sharpening circuit to the vertical nonlinear process signal, so as to generate the vertical sharpened signal.

* * * * *